(12) United States Patent  
Meyer et al.

(10) Patent No.: US 11,669,799 B2
(45) Date of Patent: Jun. 6, 2023

(54) CASCADING CALL NOTIFICATION SYSTEM AND METHOD

(71) Applicant: RXO Last Mile, Inc., Atlanta, GA (US)

(72) Inventors: Karl Meyer, Atlanta, GA (US); Jonathan Turner, Marietta, GA (US)

(73) Assignee: RXO Last Mile, Inc., Atlanta, GA (US)

( * ) Notice: Subject to any disclaimer, the term of this patent is extended or adjusted under 35 U.S.C. 154(b) by 507 days.

(21) Appl. No.: 16/542,988

(22) Filed: Aug. 16, 2019

(65) Prior Publication Data

US 2019/0370741 A1 Dec. 5, 2019

Related U.S. Application Data

(63) Continuation of application No. 14/460,786, filed on Aug. 15, 2014, now abandoned.

(51) Int. Cl.
*G06Q 10/00* (2023.01)
*G06Q 10/0833* (2023.01)
*G06Q 10/107* (2023.01)

(52) U.S. Cl.
CPC ....... *G06Q 10/0833* (2013.01); *G06Q 10/107* (2013.01)

(58) Field of Classification Search
None
See application file for complete search history.

(56) References Cited

U.S. PATENT DOCUMENTS

| 4,153,874 A | 5/1979 | Kaestner |
| 5,400,020 A | 3/1995 | Jones et al. |
| 5,444,444 A | 8/1995 | Ross |
| 5,623,260 A | 4/1997 | Jones |

(Continued)

FOREIGN PATENT DOCUMENTS

| CA | 2723506 | 4/2020 |
| WO | 2002044829 | 6/2002 |
| WO | 2008107880 | 9/2008 |

OTHER PUBLICATIONS

Meyer, Karl; Non-Final Office Action for U.S. Appl. No. 14/664,385, filed Mar. 20, 2015, dated Jan. 11, 2021, 44 pgs.

(Continued)

*Primary Examiner* — Tonya Joseph
(74) *Attorney, Agent, or Firm* — Taylor English Duma LLP

(57) ABSTRACT

A notification system comprising a service order management system and a plurality of servicer devices. The service order management system comprises a service status receiving module and an estimated time of arrival (ETA) module. The service status receiving module is configured to receive information from a plurality of servicers. The information includes starting locations, service destinations and arrival times of the services performed by each servicer. The service status receiving module is configured to record the information. The ETA module is configured to calculate an initial ETA based on at least a portion of the recorded information. Each servicer device includes a service application. Each service application is configured to automatically receive the ETA from the service order management system and automatically display an en route notification interface on the servicer device when it is determined that the initial ETA is within an ETA notification window.

11 Claims, 16 Drawing Sheets

(56) References Cited

U.S. PATENT DOCUMENTS

| | | |
|---|---|---|
| 5,648,770 A | 7/1997 | Ross |
| 5,657,010 A | 8/1997 | Jones |
| 5,668,543 A | 9/1997 | Jones |
| 5,987,377 A | 11/1999 | Westerlage et al. |
| 6,167,255 A | 12/2000 | Kennedy et al. |
| 6,278,936 B1 | 8/2001 | Jones |
| 6,313,760 B1 | 11/2001 | Jones |
| 6,317,060 B1 | 11/2001 | Jones |
| 6,363,254 B1 | 3/2002 | Jones et al. |
| 6,363,323 B1 | 3/2002 | Jones |
| 6,370,231 B1 | 4/2002 | Hice |
| 6,411,891 B1 | 6/2002 | Jones |
| 6,415,207 B1 | 7/2002 | Jones |
| 6,486,801 B1 | 11/2002 | Jones |
| 6,492,912 B1 | 12/2002 | Jones |
| 6,510,383 B1 | 1/2003 | Jones |
| 6,535,743 B1 | 3/2003 | Kennedy, III et al. |
| 6,618,668 B1 | 9/2003 | Laird |
| 6,683,542 B1 | 1/2004 | Jones |
| 6,700,507 B2 | 3/2004 | Jones |
| 6,714,859 B2 | 3/2004 | Jones |
| 6,724,887 B1 | 4/2004 | Eilbacher et al. |
| 6,741,927 B2 | 5/2004 | Jones |
| 6,748,318 B1 | 6/2004 | Jones |
| 6,748,320 B2 | 6/2004 | Jones |
| 6,763,299 B2 | 7/2004 | Jones |
| 6,763,300 B2 | 7/2004 | Jones |
| 6,804,606 B2 | 10/2004 | Jones |
| 6,859,722 B2 | 2/2005 | Jones |
| 6,904,359 B2 | 6/2005 | Jones |
| 6,952,645 B1 | 10/2005 | Jones |
| 6,962,531 B2 | 11/2005 | Pace et al. |
| 6,975,998 B1 | 12/2005 | Jones |
| 6,980,131 B1 | 12/2005 | Taylor |
| 7,026,925 B2 | 4/2006 | Roche et al. |
| 7,030,781 B2 | 4/2006 | Jones |
| 7,050,569 B1 | 5/2006 | Weaver et al. |
| 7,089,107 B2 | 8/2006 | Jones |
| 7,191,058 B2 | 3/2007 | Laird et al. |
| 7,191,142 B1 | 3/2007 | Sandell et al. |
| 7,251,312 B2 | 7/2007 | D'Evelyn et al. |
| 7,400,970 B2 | 7/2008 | Jones |
| 7,509,266 B2 | 3/2009 | Rogers et al. |
| 7,558,380 B2 | 7/2009 | Divenuta et al. |
| 7,609,832 B2 | 10/2009 | Kreiner et al. |
| 8,165,773 B1 | 4/2012 | Chavez et al. |
| 2002/0016726 A1 | 2/2002 | Ross |
| 2002/0062251 A1 | 5/2002 | Anandan et al. |
| 2002/0173934 A1 | 11/2002 | Potenza |
| 2003/0022087 A1 | 1/2003 | Tachi |
| 2003/0098802 A1 | 5/2003 | Jones |
| 2003/0223566 A1 | 12/2003 | Book et al. |
| 2003/0233190 A1 | 12/2003 | Jones |
| 2004/0030604 A1 | 2/2004 | Young |
| 2004/0093290 A1 | 5/2004 | Doss et al. |
| 2004/0122721 A1 | 6/2004 | Lasorsa |
| 2004/0172323 A1 | 9/2004 | Stamm |
| 2004/0230438 A1 | 11/2004 | Pasquale et al. |
| 2004/0243430 A1 | 12/2004 | Horstemeyer |
| 2005/0069103 A1 | 3/2005 | Divenuta et al. |
| 2005/0111955 A1 | 5/2005 | Truan et al. |
| 2005/0114167 A1 | 5/2005 | Mcevoy |
| 2005/0154626 A1 | 7/2005 | Jones |
| 2005/0171856 A1 | 8/2005 | Takahashi et al. |
| 2006/0026047 A1 | 2/2006 | Jones |
| 2006/0047419 A1 | 3/2006 | Diendorf et al. |
| 2006/0085203 A1 | 4/2006 | Schweickart et al. |
| 2006/0097896 A1 | 5/2006 | Jones |
| 2006/0111089 A1 | 5/2006 | Winter et al. |
| 2006/0111955 A1 | 5/2006 | Winter et al. |
| 2007/0071184 A1 | 3/2007 | Clift et al. |
| 2007/0233549 A1 | 10/2007 | Watson et al. |
| 2007/0255491 A1 | 11/2007 | Geelen et al. |
| 2007/0282661 A1 | 12/2007 | Franco |
| 2008/0021762 A1 | 1/2008 | Coon et al. |
| 2008/0040189 A1 | 2/2008 | Tong et al. |
| 2008/0046280 A1 | 2/2008 | Horstemeyer |
| 2008/0082257 A1 | 4/2008 | Lee |
| 2008/0169937 A1 | 7/2008 | Lowry |
| 2008/0234927 A1 | 9/2008 | O'Neill |
| 2008/0275582 A1 | 11/2008 | Nettles et al. |
| 2008/0298350 A1 | 12/2008 | Croak et al. |
| 2009/0005038 A1 | 1/2009 | Yasrebi et al. |
| 2009/0083078 A1 | 3/2009 | Landstrom et al. |
| 2009/0089135 A1 | 4/2009 | Minert et al. |
| 2009/0125425 A1 | 5/2009 | Kloostra et al. |
| 2009/0157449 A1 | 6/2009 | Itani et al. |
| 2009/0204472 A1 | 8/2009 | Einhorn |
| 2009/0220056 A1 | 9/2009 | Simpson et al. |
| 2009/0281929 A1 | 11/2009 | Boitet et al. |
| 2010/0141514 A1 | 6/2010 | Bell et al. |
| 2011/0137698 A1 | 6/2011 | Meyer et al. |
| 2011/0295078 A1 | 12/2011 | Reid et al. |
| 2012/0059681 A1 | 3/2012 | Meyer et al. |

OTHER PUBLICATIONS

Meyer, Karl; Non-Final Office Action for U.S. Appl. No. 14/664,385, filed Mar. 20, 2015, dated Aug. 17, 2021, 13 pgs.

Meyer, Karl; Advisory Action for U.S. Appl. No. 14/664,385, filed Mar. 20, 2015, dated Feb. 9, 2022, 5 pgs.

Meyer, Karl; Final Office Action for U.S. Appl. No. 14/664,385, filed Mar. 20, 2015, dated Dec. 2, 2021, 39 pgs.

Meyer, Karl; Office Action for Canadian Patent application No. 3,073,908, filed Dec. 3, 2010, dated Jan. 19, 2022, 3 pgs.

Meyer, Karl; Office Action for Canadian patent application No. 2,861,802, filed Sep. 2, 2014, dated Nov. 24, 2021, 7 pgs.

Meyer, Karl; Office Action for Canadian patent application No. 2,861,802, filed Sep. 2, 2014, dated Feb. 12, 2021, 7 pgs.

Meyer, Karl; Non-Final Office Action for U.S. Appl. No. 14/664,385, filed Mar. 20, 2015, dated Jun. 17, 2022, 13 pgs.

Meyer, Karl; Advisory Action for U.S. Appl. No. 16/664,385, filed Mar. 20, 2013, dated Jul. 12, 2021, 4 pgs.

Meyer, Karl; Final Office Action for U.S. Appl. No. 14/664,385, filed Mar. 20, 2015, dated Apr. 30, 2021, 42 pgs.

Meyer, Karl; Office Action for Canadian Patent application No. 3,073,908, filed Dec. 3, 2010, dated Apr. 27, 2021, 3 pgs.

Meyer, Karl; Final Office Action for U.S. Appl. No. 14/664,385, filed Mar. 20, 2015, dated Oct. 26, 2022, 44 pgs.

Meyer, Karl; Office Action for Canadian patent application No. 2,861,802, filed Sep. 2, 2014, dated Oct. 14, 2022, 4 pgs.

Meyer, Karl; Advisory Action for U.S. Appl. No. 12/722,474, filed Mar. 11, 2010, dated Aug. 20, 2012; 3 pgs.

Meyer, Karl; Applicant Initiated Interview Summary for U.S. Appl. No. 12/959,900, filed Dec. 3, 2010 dated May 29, 2012; 3 pgs.

Meyer, Karl; Final Office Action for U.S. Appl. No. 12/959,900, filed Dec. 3, 2010, dated Jun. 12, 2012; 63 pgs.

Meyer, Karl; Final Office Action for U.S. Appl. No. 12/959,900, filed Dec. 3, 2010, dated Nov. 20, 2014, 119 pgs.

Meyer, Karl; Non-Final Office Action for U.S. Appl. No. 12/959,900, filed Dec. 3, 2010, dated Jan. 19, 2012, 52 pgs.

Meyer, Karl; Non-Final Office Action for U.S. Appl. No. 12/959,900, filed Dec. 3, 2010, dated Mar. 6, 2014, 98 pgs.

Meyer, Karl; Non-Final Office Action for U.S. Appl. No. 12/959,900, filed Dec. 3, 2010, dated Jul. 22, 2014, 105 pgs.

Web pages from www.cleardestination.com and Internet Archive (web.archive.org) showing availability of some Information in 2008, 26 pages.

Meyer, Karl; Applicant Initiated Interview Summary for U.S. Appl. No. 13/246,494; filed Sep. 27, 2011 dated May 29, 2012; 3 pgs.

Meyer, Karl; Final Office Action for U.S. Appl. No. 13/246,494, filed Sep. 27, 2011, dated Jun. 14, 2012, 108 pgs.

Meyer, Karl; Final Office Action for U.S. Appl. No. 13/246,494, filed Sep. 27, 2011, dated Nov. 20, 2014, 75 pgs.

Meyer, Karl; Non-Final Office Action for U.S. Appl. No. 13/246,494, filed Sep. 27, 2011, dated Jan. 20, 2012, 37 pgs.

Meyer, Karl; Non-Final Office Action for U.S. Appl. No. 13/246,494, filed Sep. 27, 2011, dated Mar. 10, 2014, 56 pgs.

(56) References Cited

OTHER PUBLICATIONS

Meyer, Karl; Non-Final Office Action for U.S. Appl. No. 13/246,494, filed Sep. 27, 2011, dated Jul. 22, 2014, 65 pgs.

Meyers, Karl, Advisory Action for U.S. Appl. No. 13/246,494, filed Sep. 27, 2011, dated Aug. 23, 2012; 3 pgs.

Dempsey, "New Trends in Rapid Response Manufacturing Logistics," 1999, in Hadjiconstantinou, "Quick Response in the Supply Chain," 1999, Springer-Verlag Berlin Heidelberg New York, Chapter 11, pp. 97-130.

Meyer, Karl; Final Office Action for U.S. Appl. No. 14/664,385, filed Mar. 20, 2015, dated Apr. 25, 2019, 39 pgs.

Meyer, Karl; Final Office Action for U.S. Appl. No. 14/664,385, filed Mar. 20, 2015, dated May 9, 2018, 78 pgs.

Meyer, Karl; Non-Final Office Action for U.S. Appl. No. 14/664,385, filed Mar. 20, 2015, dated Oct. 25, 2018, 41 pgs.

Meyer, Karl; Non-Final Office Action for U.S. Appl. No. 14/664,385, filed Mar. 20, 2015, dated Oct. 31, 2017, 102 pgs.

Meyer, Karl; Non-Final Office Action for U.S. Appl. No. 14/664,385, filed Mar. 20, 2015, dated Sep. 27, 2019, 10 pgs.

Meyer, Karl; Canadian Office Action for serial No. 2,723,506, filed Dec. 3, 2010, dated Feb. 18, 2015, 7 pgs.

Zhu, "Designing and Evaluating a Web-Based Collaboration Application: a Case Study," 2001, in MJ Smith, et al., "Usability Evaluation and Interface Design: Cognitive Engineering, Intelligent Agents, and Virtual Reality,".

Meyer, Karl; Advisory Action for U.S. Appl. No. 14/460,786, filed Aug. 15, 2014, dated Feb. 26, 2016, 2 pgs.

Meyer, Karl; Decision on Appeal for U.S. Appl. No. 14/460,786, filed Aug. 15, 2014, dated Jul. 1, 2019, 17 pgs.

Meyer, Karl; Examiner's Answer to Appeal Brief for U .S. U.S. Appl. No. 14/460,786, filed Aug. 15, 2014, dated Feb. 27, 2018, 8 pgs.

Meyer, Karl; Final Office Action for U.S. Appl. No. 14/460,786, filed Aug. 15, 2014, dated Dec. 16, 2015, 7 pgs.

Meyer, Karl; Final Office Action for U.S. Appl. No. 14/460,786, filed Aug. 15, 2014, dated May 1, 2017, 14 pgs.

Meyer, Karl; Final Office Action for U.S. Appl. No. 14/460,786, filed Aug. 15, 2014, dated Sep. 7, 2016; 9 pgs.

Meyer, Karl; First Action Interview Pilot Program Pre-Interview Communication for U.S. Appl. No. 14/460,786, filed Mar. 15, 2014, dated Oct. 6, 2014; 4 pgs.

Meyer, Karl; Non-Final Office Action for U.S. Appl. No. 14/460,786, filed Aug. 15, 2014, dated Mar. 23, 2016, 11 pgs.

Meyer, Karl; Non-Final Office Action for U.S. Appl. No. 14/460,786, filed Aug. 15, 2014, dated Nov. 26, 2014, 23 pgs.

Meyer, Karl; Canadian Office Action for serial No. 2,723,506, filed Dec. 3, 2010, dated Dec. 30, 2016, 8 pgs.

Meyer, Karl; Canadian Office Action for serial No. 2,723,506, filed Dec. 3, 2010, dated Jan. 14, 2016, 7 pgs.

Meyer, Karl; Canadian Office Action for serial No. 2,723,506, filed Dec. 3, 2010, dated Nov. 7, 2018, 4 pgs.

Meyer, Karl; Canadian Office Action for serial No. 2,723,506, filed Dec. 3, 2010, dated Dec. 27, 2017, 10 pgs.

Meyer, Karl; Canadian Office Action for serial No. 2,723,506, filed Dec. 3, 2010, dated Jul. 9, 2013, 3 pgs.

Meyer, Karl; Final Office Action for U.S. Appl. No. 14/664,385, filed Mar. 20, 2015, dated Feb. 13, 2020, 37 pgs.

FIG. 13

CASCADING CALL NOTIFICATION SYSTEM AND METHOD

CROSS-REFERENCE TO RELATED APPLICATIONS

This application is a continuation of U.S. application Ser. No. 14/460,786, filed Aug. 15, 2014, which is hereby incorporated by reference herein in its entirety.

TECHNICAL FIELD

The present disclosure generally relates to service jobs, and more particularly relates to regulating service jobs.

BACKGROUND

Regarding interactions between businesses and customers, a business often may strive to provide reliable, hindrance-free services in order to foster quality customer service. In response to receiving good service, a customer is likely to return for additional business in the future and may also speak highly of the business with others. When businesses are able to satisfy customers with sound service practices, these businesses may be able to create strong relationships with customers built on dependability and quality. As a result, these businesses that provide excellent customer service are usually able to achieve long-term success.

SUMMARY

The present disclosure describes various systems and methods for notifying customers of ETAs associated with service orders. Disclosed is a notification system comprising a service order management system and a plurality of servicer devices. The service order management system comprises a service status receiving module and an estimated time of arrival (ETA) module. The service status receiving module is configured to receive information from a plurality of servicers. The information includes starting locations, service destinations and arrival times of the services performed by each servicer. The service status receiving module is configured to record the information. The ETA module is configured to calculate an initial ETA based on at least a portion of the recorded information. Each servicer device of the plurality of servicer devices includes a service application and being communicatively connected to at least the service order management system. Each service application of each servicer device of the plurality of servicer devices configured to: automatically receive the ETA from the service order management system, automatically display an en route notification interface on the servicer device when it is determined that the initial ETA is within an ETA notification window, the en route notification interface enabling a servicer to enter a modified ETA, receive from the servicer, via the en route notification interface, the modified ETA and a selection to initiate a notification to a customer; and responsive to receiving the selection to initiate the notification to the customer and the modified ETA, transmit a signal to the service order management system to notify the customer of the modified ETA, wherein enabling the servicer to enter the modified ETA enables the service order management system to notify the customer of the modified ETA which is more accurate than the initial ETA.

Also disclosed is a computer implemented method comprising: receiving, by a service status receiving module of a service order management system, information from a plurality of servicers, the information including starting locations, service destinations and arrival times of the services performed by each servicer; recording, by the service status receiving module, the information; calculating, by an estimated time of arrival (ETA) module of the service order management system, an initial ETA based on at least a portion of the recorded information; automatically receiving, by a service application, the initial ETA from the service order management system; automatically displaying an en route notification interface on at least one servicer device when it is determined that the initial ETA is within an ETA notification window, the en route notification interface enabling a servicer to enter a modified ETA; upon displaying the en route notification interface on the at least one servicer device, receiving from the at least one servicer device, via the en route notification interface, the modified ETA and a selection to initiate a notification to a customer; and responsive to receiving the selection to initiate a notification to the customer, transmitting a signal to the service order management system to notify the customer of the modified ETA, wherein enabling the servicer to enter the modified ETA enables the service order management system to notify the customer of the modified ETA which is more accurate than the initial ETA.

Also disclosed is a non-transitory computer-readable medium encoded with computer-executable instructions. The computer-readable medium comprising: logic adapted to receive information, by a service status receiving module of a service order management system, from a plurality of servicers, the information including starting locations, service destinations and arrival times of the services performed by each servicer; logic adapted to record, by the service status receiving module, the information; logic adapted to calculate, by an estimated time of arrival (ETA) module of an service order management system, an initial ETA based on at least a portion of the recorded information; logic adapted to automatically receive the initial ETA from the service order management system; logic adapted to automatically display an en route notification interface on at least one servicer device when it is determined that the initial ETA is within an ETA notification window, the en route notification interface enabling a servicer to enter a modified ETA; logic adapted to receive from the at least one servicer device, via the en route notification interface, the modified ETA and a selection to initiate a notification to a customer; and logic adapted to transmit a signal to the service order management system to notify the customer of the modified ETA upon receiving the selection to initiate the notification to the customer, wherein enabling the servicer to enter the modified ETA enables the service order management system to notify the customer of the modified ETA which is more accurate than the initial ETA.

Also disclosed is a notification system comprising a service order management system. The service order management system including an application server and being communicatively connected to at least one servicer device. The application server including at least an order management program. The service order management system configured to: receive information, by a service status receiving module, from a plurality of servicers, the information includes starting locations, service destinations and arrival times of the services performed by each servicer; record, by the service status receiving module, the information; automatically determine, by an estimated time of arrival (ETA) module, an initial ETA based on at least a portion of the recorded information and send the initial ETA to the at least one servicer device; automatically display an en route notification interface on the at least one servicer device when it is determined that the initial ETA is within an ETA notification window, the en route notification interface enabling a servicer to enter a modified ETA; responsive to receiving a selection to initiate a notification to a customer, receiving a signal from the at least one servicer device, via the en route notification interface, to notify the customer of the modified ETA; and notify the customer of the modified ETA, wherein enabling the servicer to enter the modified ETA enables the service order management system to notify the customer of the modified ETA which is more accurate than the initial ETA.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

FIG. 13 is a diagram illustrating a user interface enabling the dispatcher to view information regarding the stops and items of at least one servicer, according to various implementations of the present disclosure.

DETAILED DESCRIPTION

The present disclosure describes systems and methods for managing service orders. Although various implementations of the present disclosure are described with respect to service orders related to the delivery and installation of goods, it should be understood that the present disclosure also may include other types of services without departing from the principles described herein. Other features and advantages will be apparent to one of ordinary skill in the art upon consideration of the general principles described herein, and all such features and advantages are intended to be included in the present disclosure.

Figure 1:
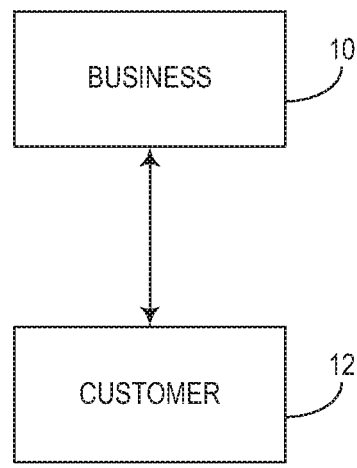
FIG. 1 is a block diagram illustrating a first embodiment of general business interactions.

FIG. 1 is a block diagram of a business interaction between a business 10 and a customer 12. The business 10 may be any company, profit center, or other entity. The business 10 may be a physical store, on-line store, service, company, or other entity. The customer 12 may be any individual (or business) who is to receive a service or who orders or purchases a product from business 10. In such an interaction as illustrated in FIG. 1, the business 10 provides goods and/or services directly to the customer 12. During this interaction, there are several opportunities for the business 10 to display customer service. One example is when the customer 12 interacts with a salesperson, sales clerk, or cashier. Another example is when the customer 12 receives a service such as a repair, maintenance, improvement, legal service, or delivery. Additionally, there are several other typical interactions that provide business 10 with opportunities to make a good impression on customer 12. When a service is to be performed in this arrangement, the business 10 employs internal servicers who provide the service directly to the customer 12. Various examples of non-limiting services may include a delivery of a purchased product, a plumbing service, tax return preparation, automobile repair, and the like.

Figure 2:
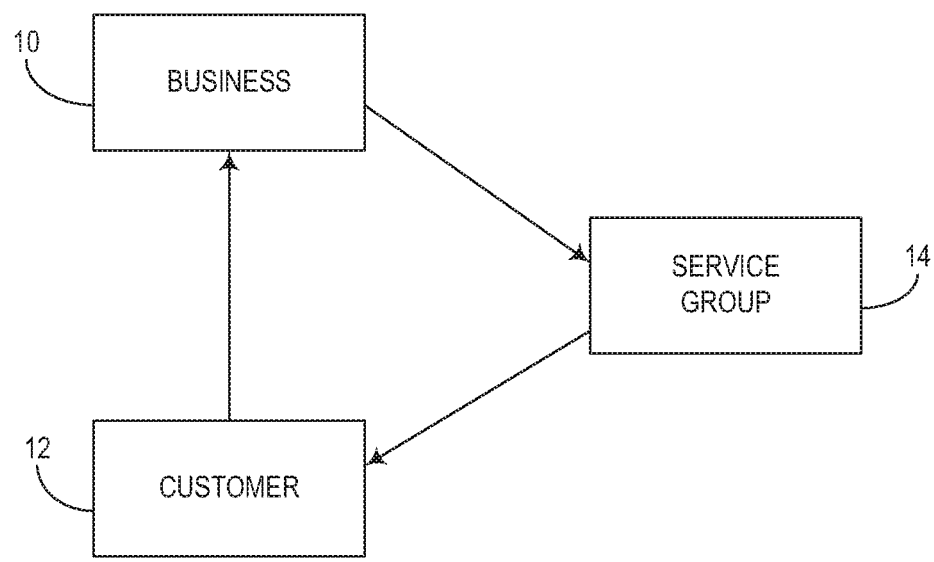
FIG. 2 is a block diagram illustrating a second embodiment of general business interactions.

FIG. 2 shows another example of a general business interaction in which the customer 12 pays the business 10 for goods or services, the business 10 provides a service group 14 with information (e.g., a service order) for fulfilling the service, and the service group 14 provides the service to the customer 12 on behalf of the business 10. The service group 14 includes the service professionals and other people involved in the business of offering one or more services and is often a separate entity from the business 10. For example, the service group 14 may be responsible for delivering, building, assembling, installing, maintaining, repairing, improving, testing, demonstrating, removing, and/or other service actions. In the arrangement of FIG. 2, the business 10 may be considered a client of the service group 14.

According to various implementations, the customer 12 may provide the business 10 with personal information, such as name, address, phone numbers, e-mail addresses, etc., which can be used for contacting the customer 12, for instance, to confirm and/or provide the intended services to be provided in accordance with a service order. In some cases, the personal information may include a phone number that is not the number associated with a service location. For example, the phone number provided in a service order may be a specific number that the customer wants as the primary contact number for the intended service. For example, the primary contact number in one embodiment may be a work number, cell phone number, relative's number, neighbor's number, landlord's number, building manager's number, or the number of any person who may allow access to the service location on the customer's behalf. Other ordering information may be exchanged or created, including special instructions for delivery, unpacking or assembly requests, and/or installation requests. Orders can usually be taken in any number of ways, including transactions in person, by phone, by mail, by e-mail, by the Internet, or by other ordering methods. The business 10 may provide a service order containing some of this order information to the service group 14 so that the service group 14 can perform the service properly. The service order containing the order information may be provided by an automatic ordering system, by facsimile device, by e-mail, by phone, or in any other manner. The service group 14 may pick up products, as necessary, from the business's store, warehouse, supplier, etc., and deliver the products to one or more customers 12. In accordance with some embodiments, the customer 12 may provide additional service instructions directly to the service group 14.

Figure 3:
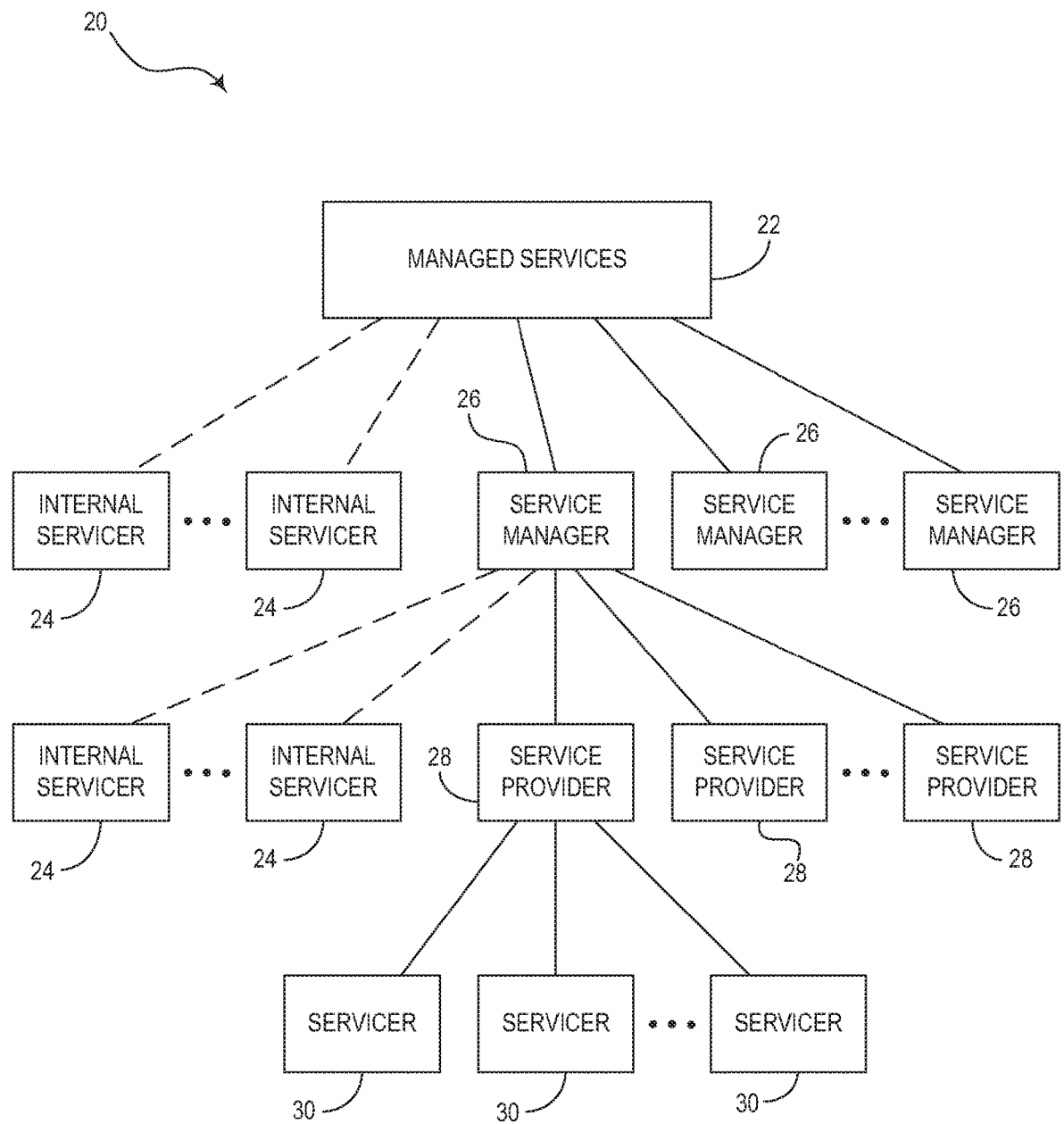
FIG. 3 is a block diagram illustrating an embodiment of a service group according to various implementations of the present disclosure.

FIG. 3 is a block diagram showing an embodiment of a service group 20, such as the service group 14 shown in FIG. 2. In this implementation, managed services 22 may represent a service company, which may be responsible for the management of internal servicers 24, who are employed by a client business, and service managers 26, who may be employed by the managed services 22 company or may be independent contract companies. In some cases, the managed services 22 may include operators who manage the services for a particular client. In other implementations, servicers 30 may be direct independent contractors to managed services 22. According to various implementations of the present disclosure, the managed services 22 may include a service order management system, which may be configured to manage service orders and provide automatic confirmation and call-ahead notifications to customers of upcoming services to be performed. More details of the service order management systems are described below.

The service managers 26 may be field managers, regional managers, or local managers who manage one or more service providers 28, often in a particular region and/or for a specific client. The service managers 26 may also manage one or more internal servicers 24. The service providers 28 manage a number of servicers 30, who may be employed by the service providers 28 or may be independent contractors. The servicer 30 may be the individual or team representing the service group 20 (or service group 14 shown in FIG. 2) and who may interact directly with the customer 12.

Figure 4:
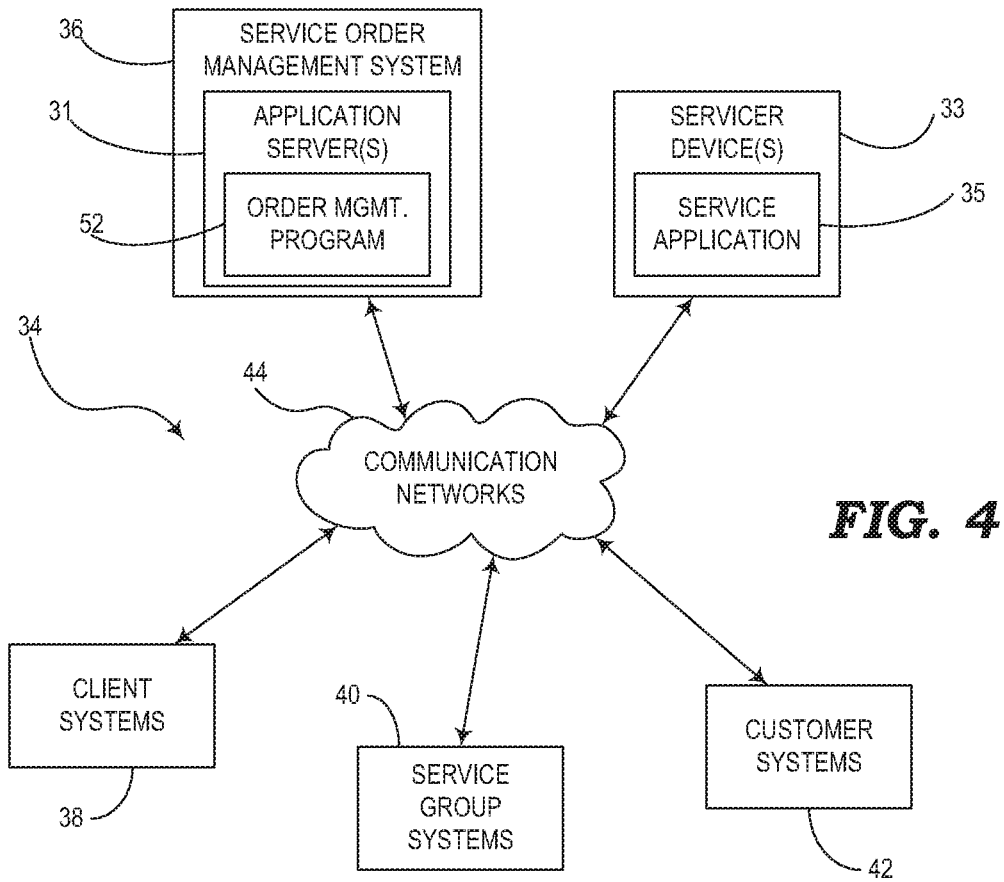
FIG. 4 is a block diagram illustrating a service network system according to various implementations of the present disclosure.

FIG. 4 is a block diagram of an embodiment of a service network system 34, according to various implementations of the present disclosure. The service network system 34 includes one or more servicer devices 33, a service order management system 36 (described in more detail below), client systems 38, service group systems 40, and customer systems 42. These and other systems are capable of interacting and communicating via one or more communication networks 44. The communication networks 44 may include telephone lines, such as land line or public switched telephone network (PSTN) systems, mobile phone channels and systems, communication channels for exchanging data and information, such as a local area network (LAN), wide area network (WAN), the Internet, or other data, communication, and/or telecommunication networks.

The client systems 38 may represent any business, such as the business 10 described with respect to FIGS. 1 and 2. In the environment of the service network system 34 of FIG. 4, the client systems 38 represent at least a part of a business that is a client of the service group. The service group utilizes the service group systems 40. The service group may be responsible for performing one or more services on behalf of the clients. The service group may be the service group 20 described with respect to FIG. 3 or other group of servicers, service providers, service managers, and/or managed services. In some embodiments, the service order management system 36 may be part of the client systems 38 or may be part of the service group systems 40. As suggested in FIG. 1, the client systems 38 and service group systems 40 may be part of one company or enterprise.

According to various embodiments of FIG. 4, the service group systems 40 may include equipment used by the servicers and by field managers. For example, the service group systems 40 may include mobile phones, applications or features on mobile phones, other handheld devices, laptop computers, or other devices. The servicer, via the service group system 40, may be in continuous contact with the service order management system 36.

Figure 5:
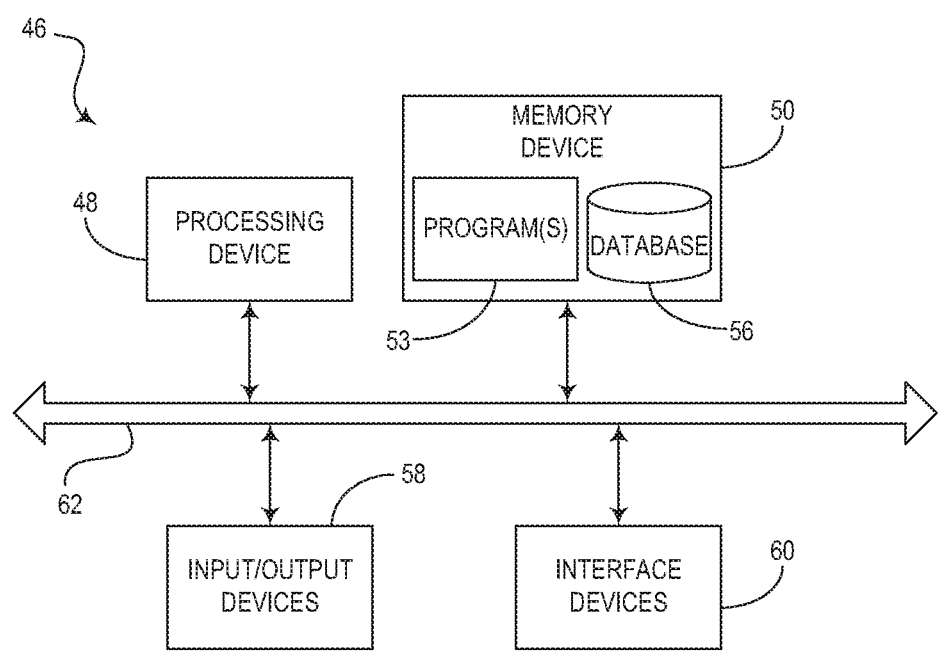
FIG. 5 is a block diagram illustrating an embodiment of the computer processing system, according to various implementations of the present disclosure.
Figure 6:
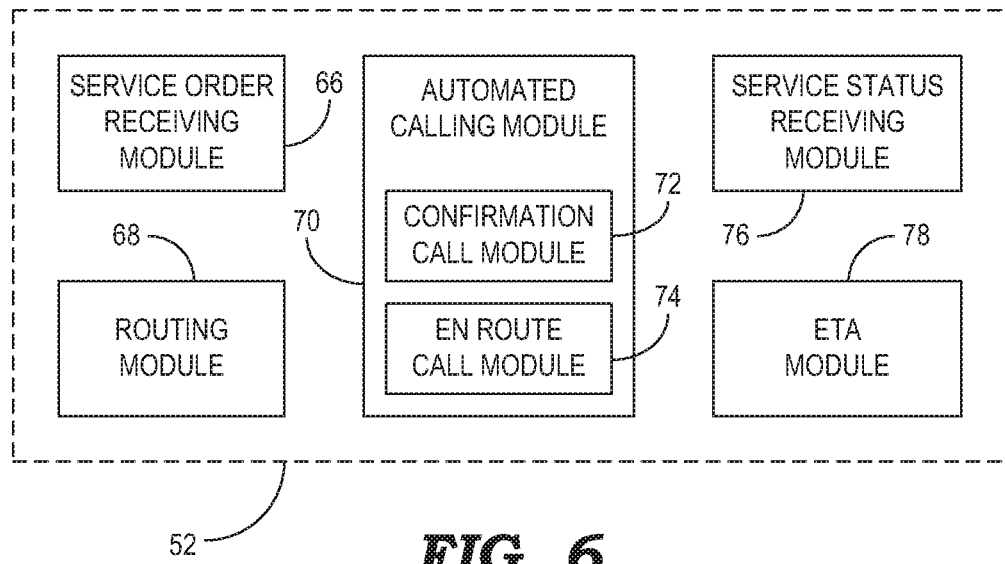
FIG. 6 is a block diagram illustrating an embodiment of the order management program shown in FIG. 4, according to various implementations of the present disclosure.

Service order management system 36 may include one or more application servers 31, which may include an order management system 52 (further described in FIG. 6). The one or more application servers 31 may include one or more processors and one or more memory (e.g., seen in FIG. 5, processor 48 and memory 50). Additionally, dispatchers may view and interact with a web-based application or a webpage that communicates with the service application 35 and other aspects of the service network system 34.

In some embodiments, each component of the service order management system 36, as shown, may include multiple components on multiple computer systems of a network. For example, the managed services 22 of the service group may comprise computer servers, such as application servers, file servers, database servers, web servers, etc., for performing various functions described herein. The computer servers of the service order management system 36 may for example be physically separate computer servers or servers in a VMware ESXi 4.0 virtual environment, among other implementations. In addition, the internal servicers 24, service managers 26, service providers 28, and/or servicers 30 may utilize laptop or desktop computer systems, which may form part of the service order management system 36 and may be used for accessing the computer servers as needed.

The one or more servicer devices 33 may be a device used by a servicer and may be a mobile phone, other handheld device, laptop computer, or other types of device. A service application 35 may be software executing on the servicer device 33. Also, the servicer device 33 may provide a user interface to a servicer that is provided by the service application 35. The servicer device 33 and service application 35 may be used by servicers and others that are involved with the customer service or delivery. The one or more servicer devices 33 may communicate with any component of the service network system 34, for example, by the use of communication network 44.

FIG. 5 is a block diagram illustrating an embodiment of a computer processing system 46, according to various implementations of the present disclosure. The computer processing system 46 may represent a server computer or computing device comprising the service order management system 36 shown in FIG. 4, a portion or all of the service group systems 40 shown in FIG. 4, and/or other systems or devices associated with communicating information among a network associated with a service group. In some embodiments, the components of the computer processing system 46 may reside on multiple systems and/or may include complementary hardware and/or software.

As shown in the embodiment of FIG. 5, the computer processing system 46 includes a processing device 48 and a memory device 50, which may include one or more programs 53 and a database 56. The computer processing system 46 further includes input/output devices 58 and interface devices 60. The components of the computer processing system 46 are interconnected and may communicate with each other via a computer bus interface 62 or by other communication devices.

The processing device 48 may be one or more general-purpose or specific-purpose processors or microcontrollers for controlling the operations and functions of the computer processing system 46. In some implementations, the processing device 48 may include a plurality of processors, computers, servers, or other processing elements for performing different functions within the computer processing system 46.

The memory device 50 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The one or more programs 53 and database 56 may be stored in one or more memory devices 50 and run on the same or different computer systems and/or servers.

The input/output devices 58 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output devices 58 may also include interaction devices configured to receive input and provide output, such as dongles, touch screen devices, and other input/output devices, to enable input and/or output communication.

The interface devices 60 may include various devices for interfacing the computer processing system 46 with one or more other computer processing systems 46 of the service network system 34 via any type of communication system, such as the communication networks 44. The interface devices 60 may include devices for communicating with the client systems 38 and customer systems 42. The interface devices 60 may include a telephone/voice interface device for controlling an IVR device and accessing a telephone network. Also, interface devices 60 may include various devices for interfacing with a data network, such as the Internet, to enable the communication of data. In some examples, the interface devices 60 may include Dialogic cards, Dialogic Diva softiP software, Envox, a voice over Internet protocol (VoIP) device, or other hardware or software interface elements.

FIG. 6 is a block diagram showing an embodiment of the order management program 52 shown in FIG. 4. The order management program 52 may be a particular program of the one or more program 53, and as such, the order management program 52 may be stored in the memory device 50. The order management program may include any suitable instructions for processing a customer's service order. For example, the order management program 52 may be configured as Dispatch Office® or other software for managing service orders. In some implementations, the order management program 52 may include the capability of tracking deliveries. The order management program 52 in some embodiments may be placed in a separate processing system. As described in more detail below, the order management program 52 is able to receive service orders and create a routing schedule to efficiently provide services to customers at a number of different locations. The order management program 52 may also include a feature for automatically calling the customers to confirm service order information and to notify the customer of the estimated time of arrival (ETA) of a servicer. Additionally, the order management program 52 may be configured to record information related to the services being performed and may receive and/or calculate the ETA when a servicer is expected to arrive at the next service destination.

The order management program 52 of the present disclosure may be implemented in hardware, software, firmware, or any combinations thereof. In accordance with one embodiment, the order management program 52 may be implemented in software or firmware that is stored on a memory device (e.g., memory device 50) and that is executable by an instruction execution system (e.g., processing device 48). The order management program 52 may be implemented as one or more computer programs stored on different memory devices or different computer systems of a network. If implemented in hardware, the order management program 52 may be implemented using discrete logic circuitry, an application specific integrated circuit (ASIC), a programmable gate array (PGA), a field programmable gate array (FPGA), or any combinations thereof.

As illustrated in this embodiment of FIG. 6, the order management program 52 comprises a service order receiving module 66, a routing module 68, and an automated calling module 70. The automated calling module 70 may include, among other things, a confirmation call module 72 and an en route call module 74. The order management program 52, as illustrated, also includes a service status receiving module 76 and an ETA module 78.

The service order receiving module 66 of FIG. 6 may be configured to receive service orders from a sales department or from another business (e.g., in a client/service group arrangement). The service orders may be received electronically via e-mail, web-based applications, electronic data interchange (EDI), or other electronic communication tools; received via facsimile, phone, etc. and entered by a data entry person; or received by other means. The received service orders may be stored, for example, in the memory device 50 shown in FIG. 5. Among other things, the service orders may include contact information of a customer intended to receive a service. The contact information may include an address (e.g., a service destination), telephone numbers, mobile phone numbers, e-mail addresses, and other information.

The routing module 68 may retrieve all the service orders to be fulfilled in a particular service day (e.g., the next calendar day or next business day) from the service orders received by the service order receiving module 66. The routing module 68 may use up-to-date road map information, travel time estimation software, service performance times representing a typical amount of time required to perform each specific service, and/or other factors for determining efficient routes for one or more servicers who are capable and/or qualified to perform the services. Records of the availability and qualifications of multiple servicers may also be kept to help optimize the service schedules. These and other factors may be considered in the calculations by the routing module 68 to determine efficient routes, service areas, servicers, service schedules, and other related routing information. Ultimately, the routing module 68 may provide a plurality of service schedules, where each service schedule is given to a servicer or service team to perform a number of service jobs in a particular service day.

The automated calling module 70 may be configured as or associated with an IVR device. The automated calling module 70 may include an automatic dialer or other automated telephone device configured to automatically place telephone calls to the customers. In some embodiments, the automated calling module 70 may include logic for suspending calls that are being made to telephone numbers on a "do not call" list. When an automated call is made to the customer, the automated calling module 70 may play a predetermined script and include relevant service order information, such as the items being delivered, the services to be performed, the servicer's ETA, or other information. Additionally, the automated calling module may be configured to leave a voice mail for the customer if the automated call is not answered.

The confirmation call module 72 and/or en route call module 74 may be configured to offer several options to the customer in response to the indication of the scheduled service order fulfillment information. For example, the respective call module of the automated calling module 70 may allow the customer to confirm that the customer is available to receive the scheduled service. The customer may be given an option to re-schedule the service, if necessary, using voice and/or keypad entries. Also, the customer may be given an option to transfer the call from the IVR to a live operator. In some embodiments, the customer may also be given an option to opt out of the service altogether. According to some implementations, the confirmation call module 72 and/or en route call module 74 may prompt the customer to enter his or her choices by speaking into the headset (when voice recognition software is being utilized) and/or by pressing numbers on the customer's telephone keypad.

In accordance with one embodiment of the automated calling module 70, the confirmation call module 72 may be configured to place a call to the customer several hours or days before the scheduled service time. For example, the call may be placed the evening before the scheduled service day. The purpose of this conformation call may be to inform the call's recipient of a large service time window (e.g., a four hour window from 1:00 P.M to 5:00 P.M.) during which the service is likely to take place. This allows the customer to make arrangements to provide adequate access to the servicer's destination when the servicer arrives. In some embodiments, the customer may be given an option to connect to a live operator if desired. This feature may allow the customer to receive additional information about the service order, change the service time, or other actions that may require a live operator.

In accordance with some embodiments, a second call may be made using the en route call module 74. The en route call module 74 may be configured to call the customer at a "call-ahead time," which may be defined as a calculated time of day before the servicer's ETA at a particular service destination. The call-ahead time may be based on the ETA and a predetermined advanced-warning time period. For example, in one embodiment, the predetermined advanced-warning time period, or notification window, may be set to a minimum of 2 minutes and a maximum of 60 minutes. For example, if the ETA is calculated to be 3:30 p.m., the en route call module 74 may be configured to ask the servicer if the servicer would like to initiate the second call at 2:30 p.m. (i.e., the call-ahead time or notification window equals the ETA minus the predetermined advanced-warning time period). However, other minimum and maximum time periods may be used for the advanced-warning time period. In accordance with one embodiment, the predetermined advanced-warning time period is determined by the system and applied to all service orders in the same manner.

This second call, or en route notification, may be more accurate because it is based on real-time conditions and is based on the ETA received and/or calculated by the ETA module 78 and any additional information input by the servicer in the field. In some embodiments, the servicer may simply enter the ETA based on the servicer's knowledge of particular routes, traffic conditions, and/or other factors. For example, if the servicer is delayed based on unforeseen events earlier in the service day, the ETA module 78 provides an ETA that is an accurate time estimate, and the en route call module 74 may notify the customer of the more accurate time estimate. Further, the ETA may be communicated to the customer, or other recipient specified in the service order, as a range of times. For example, the ETA for the servicer to arrive at the applicable destination may be between 3:20 p.m. and 3:40 p.m.

The service status receiving module 76 may be configured to receive information from the servicers regarding the status of the services performed by each servicer. Also, the service status receiving module 76 may receive information regarding the current location of the servicers and the servicers' next destinations. In one embodiment, the service status receiving module 76 may receive information related to the starting locations of the servicers and may record various service destinations and arrival times throughout the service day. In some embodiments, these records may be used to adjust the processes used by the routing module 68. Also, this information may be used to determine or refine travel times from various starting locations to the various service destinations.

In accordance with one embodiment, the ETA module 78 may be configured to utilize similar algorithms used by the routing module 68 to calculate the servicer's estimated travel time between two points (e.g., from one service destination or starting location to a next service destination). The ETA module 78 may be configured to calculate the time of day that the servicer may be expected to reach the next service destination based on the servicer's starting location, the time when the servicer is leaving the starting location or previous service destination, the estimated travel time based at least on map routing characteristics, and other factors. In one embodiment, the ETA module 78 calculates the ETA upon receipt of the selected next service destination from the servicer. The servicer may send his/her choice of the next destination to the ETA module 78 in a number of ways including utilizing, for example, a mobile phone, telephone, portable facsimile machine, a handheld device, or other communication device. In some embodiments, the servicer may communicate with a dispatcher who is associated with the service group and is able to enter the applicable information into the system.

In some embodiments, the ETA module 78 (FIG. 6) may present a calculated ETA to the servicer and may allow the servicer to edit, accept, and/or update the calculated ETA. Edits to the ETA may be made based in part on real time conditions, such as current traffic conditions, weather conditions, or other conditions. The modified ETA can be communicated back to the service order management system 36 by any communication means. The service order management system 36 may then adjust any applicable call-ahead times accordingly. In some cases, the servicer may adjust the ETA themselves by adding or subtracting time to the ETA. Based on the servicer's experience, familiarity with the route or destination, and other factors, the servicer may be able to estimate the time of arrival better than traditional software programs. In this embodiment, the ETA module may receive the ETA from the servicer, store the ETA in memory and communicate the ETA to the customer at the call-ahead time.

For example, the servicer may add time to the ETA to fill up the servicer's vehicle with gasoline, to stop for lunch, to take a break, to account for traffic, to account for road and/or weather conditions, or other factors that may not be anticipated by the ETA module 78. In this case, the ETA module 78 may adjust the ETA calculations based on the selection or communication made by the servicer. For example, if the ETA module 78 provides an initial ETA of 3:00 p.m., the servicer may adjust the ETA to 3:15 p.m. in order to take a fifteen minute break. Additionally, the servicer may subtract time from the ETA when, for example, traffic congestion is less than anticipated by the ETA module 78, the servicer takes a quicker, alternative route to the destination that is not provided by the ETA module 78, or other ways in which the servicer plans to arrive at the destination earlier than the ETA module 78 anticipated. In this case, the ETA module 78 may also adjust the ETA calculations based on the selection or communication made by the servicer. For example, if the ETA module 78 provides an initial ETA of 3:00 p.m., the servicer may adjust the ETA to 2:45 p.m. if the servicer takes a quicker, alternative route to the destination that is not provided by the ETA module 78, and the servicer believes it will decrease the ETA time by fifteen minutes.

In some embodiments, the automated calling module 70 may be configured to place one call at a time. Therefore, if the calculated call-ahead times for different servicers travelling to different customers happens to be the same, the automated calling module 70 may prioritize the calls to allow one call to be made before another. This sequence of calls may be created using any combination of prioritizing algorithms. Additionally, in some embodiments, all en route notification calls are prioritized and placed ahead of any other type of call in the queue of the automated calling module 70.

Referring again to FIG. 4, communication between the servicer and the service order management system 36 may be enabled in a number of ways. For example, the servicers may carry a handheld device (e.g., servicer device 33) that is configured to display a service schedule for the servicer's shift and may include the names and addresses of customers to whom the services are performed. The handheld devices may also be configured to enable the servicer to indicate the arrival at a pick-up location, departure from the pick-up location, arrival at a service location, departure from the service location, and the intended next service destination. The servicer may be enabled to select the order of destinations and adjust the anticipated ETA to reach each destination. In some embodiments, the handheld device may also be configured to list items to be picked up and remove the items from the list as they are loaded in the servicer's vehicle. Further, the handheld device may include a scanner to scan items as they are being picked up or delivered, to thereby track the items. Various implementations of the handheld devices are described in more detail below.

According to some embodiments of the service order management system 36, the servicer may communicate with the service order management system 36 without the use of a handheld device. For example, the servicer may carry a copy of the service schedule, which may include, for example, the names and addresses of the customers, service order numbers, expected service times or other information. The servicer may also carry route sheets, manifests, directions between service destinations and other useful paperwork. Without a handheld device, the servicer may use a mobile phone to communicate with an IVR system associated with the service order management system 36. The IVR system may be configured to prompt the servicer through a number of selections and menus to track the servicer's location or progress and/or to enable communication of other information. In this respect, the service order management system 36 may be configured to enable the servicer to select options over a mobile phone or land line phone to indicate the completion of the service jobs, indicate the next destination or service order number of the next destination, or enter an ETA to reach the next destination.

Figure 7:
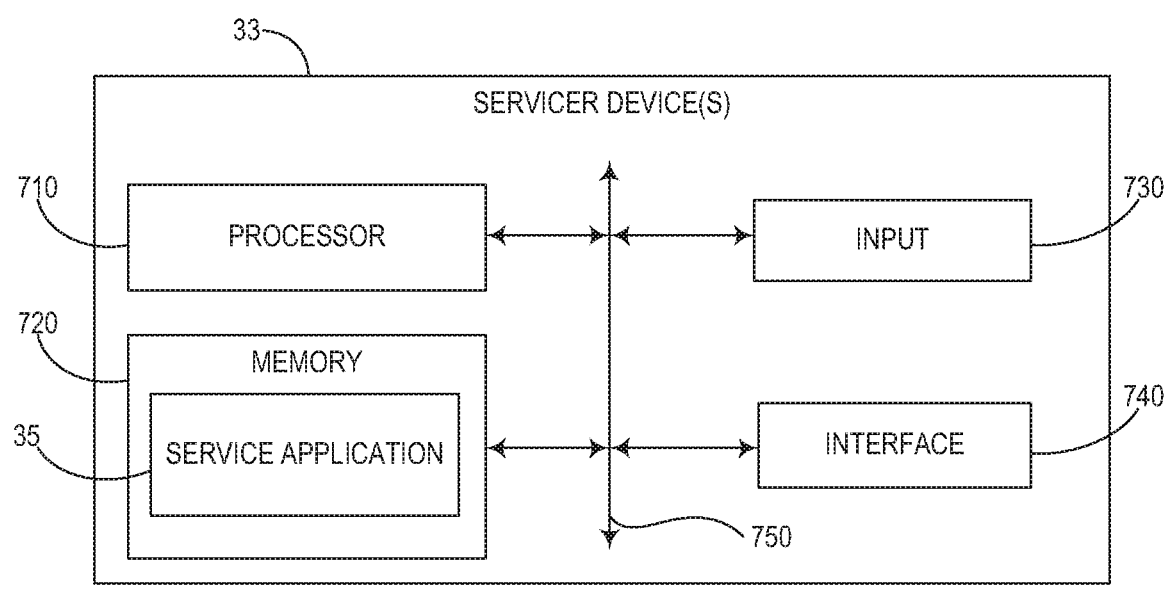
FIG. 7 is a block diagram illustrating an embodiment of a servicer device, according to various implementations of the present disclosure.

FIG. 7 is a block diagram illustrating an embodiment of a servicer device 33, including the service application 35. In some embodiments, there may be more than one servicer device 33. A servicer device 33 may be a mobile phone, other handheld device, laptop computer, electronic device, or other types of device. As shown in the embodiment of FIG. 7, a servicer device 33 may include a processing device 710 and a memory device 720, which may include a service application 35. The service application 35 may be stored on the memory device 720 and executed by the processing device 710. The computer processing system 46 further includes input/output 730 and an interface 740. The components of the servicer device 33 are interconnected and may communicate with each other via a computer bus interface 750 or by other communication devices.

The processing device 710 may be one or more general-purpose or specific-purpose processors or microcontrollers for controlling the operations and functions of the servicer device 33. In some implementations, the processing device 710 may include a plurality of processors, servers, computers, servers, or other processing elements for performing different functions within the servicer device 33. The processing device 710 may be configured to execute functions and processes of the servicer application 35.

The memory device 720 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The memory device 720 may be configured to store the servicer application 35.

The input/output 730 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output 730 may also include interaction devices configured to receive input and provide output, such as dongles, touch screen devices, and other input/output devices, to enable input and/or output communication.

The interface devices 740 may include various devices for interfacing the servicer device 33 with one or more other component of the service network system 34 via any type of communication system, such as the communication networks 44. The interface devices 740 may include a telephone/voice interface device for controlling an IVR device and accessing a telephone network. Also, interface devices 740 may include various devices for interfacing with a data network, such as the Internet, to enable the communication of data. In some examples, the interface devices 740 may include Dialogic cards, Dialogic Diva softiP software, Envox, a voice over Internet protocol (VoIP) device, or other hardware or software interface elements.

Figure 8:
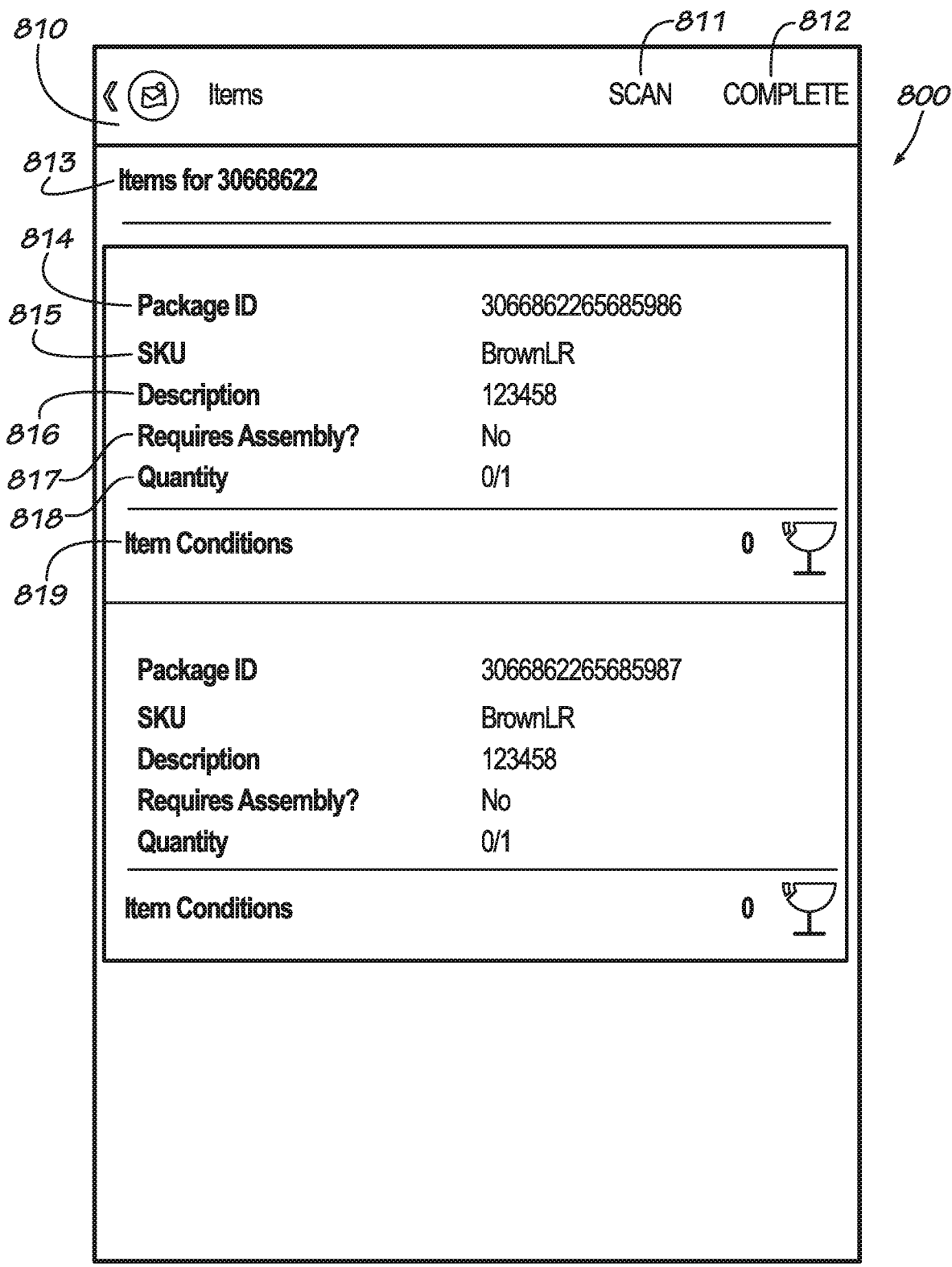
FIG. 8 is a diagram illustrating a user interface of a service application enabling the servicer to view an item list that the servicer is scheduled to deliver, according to various implementations of the present disclosure.

FIG. 8 is a diagram illustrating a user interface 800 of the service application 35 enabling the servicer to view a list of items, if there are any, that the servicer is scheduled to service or deliver to a particular customer. As previously mentioned, the service application 35 may be part of the at least one servicer device 33, and communicate at least with other components of the service network system 34. The service application 35 may be used by servicers and others that are involved with the customer service or delivery. Additionally, dispatchers may view and interact with a web-based application or a webpage that communicates with the service application 35 and aspects of the service order management system 36. The servicer, in the current embodiment, may be required to log-in to the service application 35 to see their information—such as information about the servicer's route, items, and ETAs, among other information.

As illustrated in this illustrative user interface, the user interface 800 may comprise an item interface 810 that includes the items that are to be delivered or serviced to at least one customer. The item interface 810 may include a scan option 811, which will enable the servicer to scan items for a multitude of purposes, including taking inventory. The scan option 811 may be configured to scan bar codes placed on items to be serviced or delivered. Using the scan option 811, the service application 35 is able to identify items that are to be loaded on the servicer's vehicle or unloaded from the servicer's vehicle. The scan option 811 can also be used to scan items that may have been damaged and are not to be delivered to the customer. The scan option 811 may be used if the device that the servicer is using has a scan feature associated with the device. Otherwise, additional components may be used to enable the scan option 811. Additionally, the item interface 810 may include a complete option 812 that may enable to servicer to at least exit the item interface 810. Customer identification 813 may be provided in order to identify the customer that is associated with the items in the item interface 810. Moreover, item interface 810 may include other information about items, for example, a package identifier, such as Package Id 814, Stock Keeping Unit (SKU) 815, a description of the item, such as description 816, information pertaining to assembly requirements, such as assembly requirement information 817, information about the quantity of an item, such as quantity 818, and an indication of item condition, such as item condition information 819. For the item condition information 819, when the servicer picks up or delivers an item, the condition of the item can be noted. If a problem has been recorded, then the broken glass icon in the item condition information 819 row may appear. However, such a configuration is not required, and no icon or different icons may be used. According to various implementations, there may be any number of items in the item interface 810.

Figure 9A:
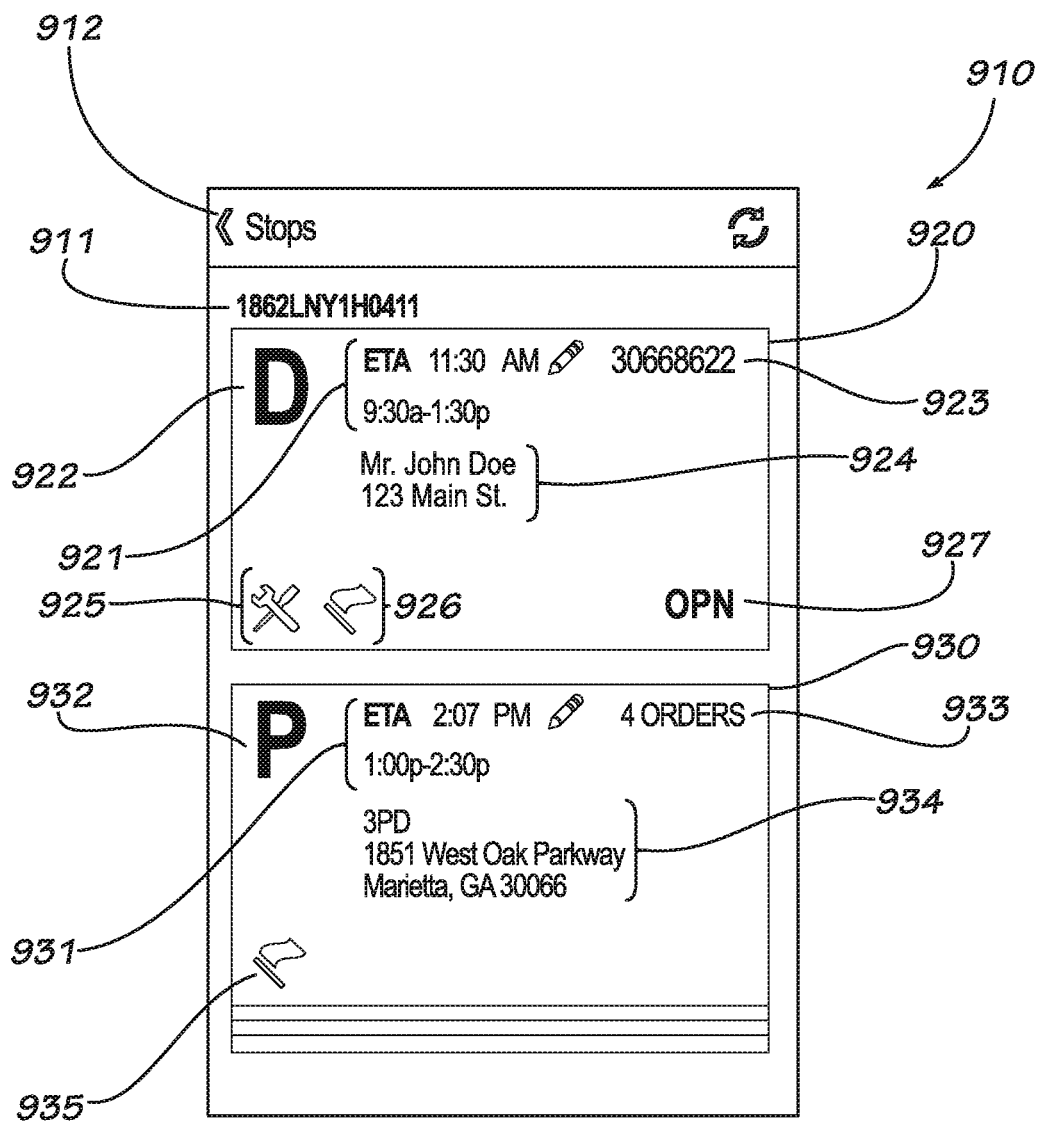
FIG. 9A is a diagram illustrating a user interface of the service application enabling the servicer to view a list of stops the servicer is scheduled to make, according to various implementations of the present disclosure.

FIG. 9A is the user interface 900 illustrating a stop interface 910 of the service application 35 enabling the servicer to view a list of at least one of the stops that the servicer is scheduled to make. As illustrated in this illustrative user interface 900, the service application 35 may comprise a stop interface 910 that includes at least one stop where an item is to be delivered or serviced for at least one customer, and the stop interface 910 may include a route identification 911. Interface 920 may be illustrative of an interface that is provided after an en route call has been made. Interface 920 may include an indication of the ETA and service window, such as ETA indicator 921 and an indication of the status, such as status symbol 922. For example, in the current embodiment, interface 920 includes a "D" in the status symbol position, which indicates an item is to be delivered, and interface 930 include a "P," which indicates an item is to be picked up. Moreover, other indicators may be used for status symbol 922, for example, an "S" symbol indicates the stop is a service order.

Also, interface 920 may include an indication of the order number or number of orders, such as order indicator 923, and an indication of particular customer information, such as customer information 924, which may include the customer's name, address, phone number, and other types of contact information, among other information that may be useful or relevant for the servicer. Moreover, interface 920 may include a stop exceptions button 926, which takes the service application 35 to a different interface that enables the servicer to view, add, or delete exceptions for that particular stop. The stop exceptions button 926 may be selected by the servicer if the servicer encounters an unexpected occurrence during the service. For example, if the customer or another is not at the location service is to be rendered when the servicer arrives, the servicer may select or otherwise input such information upon selecting the stop exceptions button 926. Also, by way of example, if the servicer is outside of the service window when the servicer arrives at the location of service or the servicer is a certain period of time before or after the ETA provided, the servicer may select or otherwise input such information upon selecting the stop exceptions button 926. Interface 920 includes an additional services button 925, and a current shipment status 927. When the additional services button 925 is selected, an additional services window may pop-up that may include additional services requested or otherwise to be provided by the servicer. For example, additional services may include assembly or installation of a delivered item, disassembly of an item to be picked up, or carrying the delivered or picked up item up or down stairs, among others. For the current shipment status 927, "OPN" indicates the shipment is open (i.e., the shipment has been dispatched to the driver). Additionally, other current shipment status indicators may be used including "ATP" (at pickup), "ONB" (on board), "ATD" (at destination), "CLS" (closed), "AOH" (arrived at origin hub), "DAL" (dropped at line haul), "OHD" (arrived at destination), "ADH" (arrived at destination hub), "PUD" (picked up at destination), among others.

Additionally, interface 930 may be illustrative of an interface that is provided before an en route call has been made. Interface 930, in the current embodiment, includes all of the components and indicators of interface 920, but for a different stop, such as ETA indicator 931, status symbol 932, order indicator 933 (similar to 923), customer information 934, and stop exceptions button 935. However, such a configuration is not required, and interface 930 may not include all of the components and indicators of interface 920. Also, the servicer may modify or update the service window or ETA for each stop by selecting ETA indicator 921 or 931, respectively (as described below in regard to FIG. 9B). However, such a configuration is not required, and no icon or different icons may be used. According to various implementations, there may be any number of items in the item interface 910.

Figure 9B:
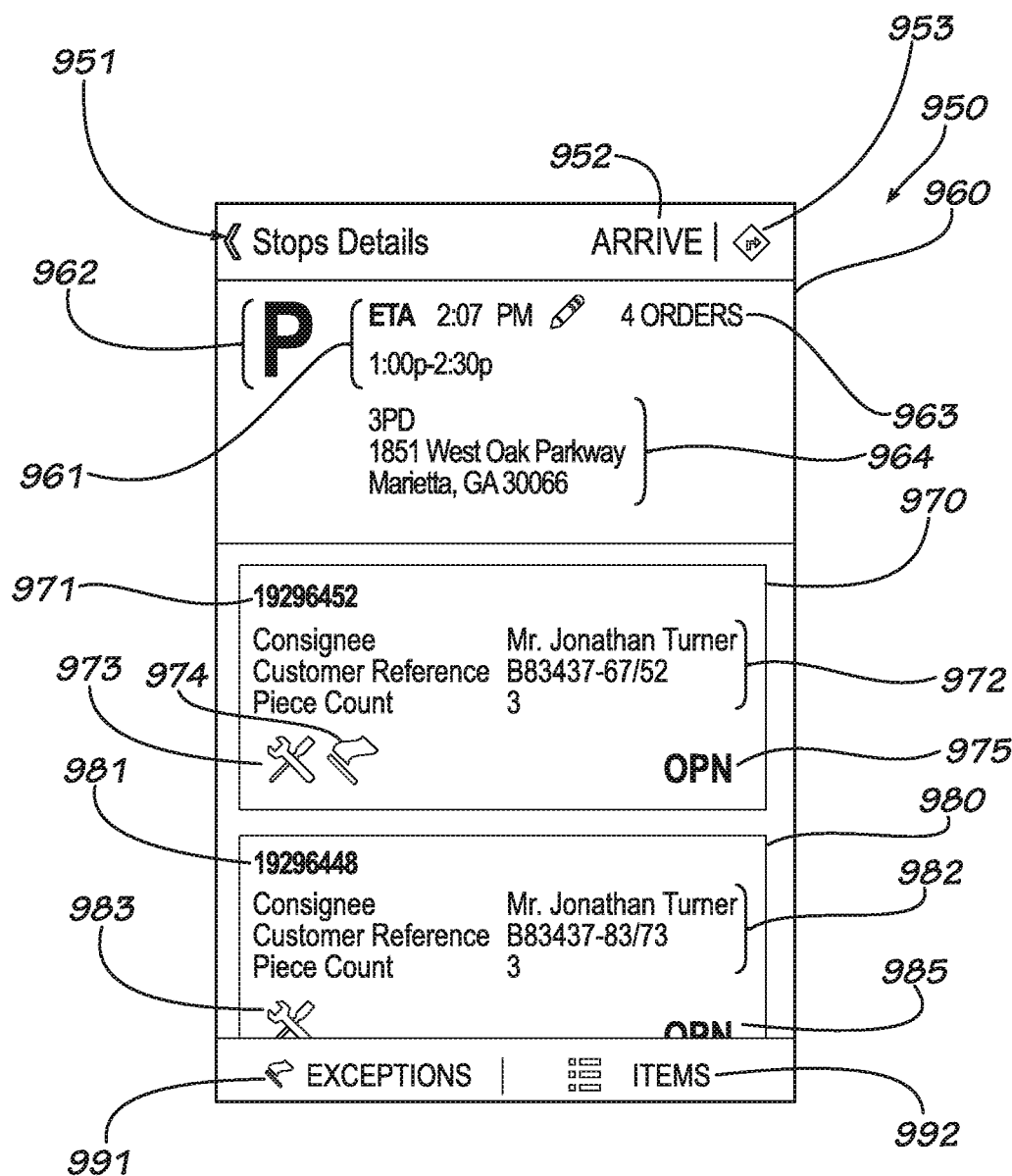
FIG. 9B is a diagram illustrating a user interface of the service application enabling the servicer to view stop details for a particular stop the servicer is scheduled to make, according to various implementations of the present disclosure.

FIG. 9B is the user interface 900 illustrating a stop interface 950 of the service application 35 enabling the servicer to view stop details for a particular stop the servicer is scheduled to make, according to various implementations of the present disclosure. Interface 950 may be illustrative of an interface that is provided after an en route call has been made. Interface 950 may include a stop details button 951, which enables the servicer to go back to the interface as shown in FIG. 9A. Also, interface 950 may include an arrive button 952, which, when selected by the servicer, the interface 950 will display a pop-up asking the servicer if they have arrived (there will also be a "yes" or "no" selection provided to the servicer when the pop-up is displayed). Also, turn arrow 953 may be provided, which will enable to servicer to navigate to the next stop location. Customer summary 960 may be provided and include ETA indicator 961, which when selected will enable the servicer to update and modify the ETA and service window and status symbol 962 (similar to status symbols 922 and 932 of FIG. 9A). Customer summary 960 may include an indication of the order number or number of orders, such as order indicator 963, and an indication of particular customer information, such as customer information 964 (similar to customer information 924 of FIG. 9A).

Also, FIG. 9B may include item information for each order of the stop, such as order information 970 and order information 980. Order information 970 may include an order number 971 and customer information 972, which may include the "Consignee" name, customer reference, and piece count (i.e., the number of pieces with the order). Additionally, order information 970 may include an additional services button 973 (similar to the additional services button 935 of FIG. 9A), a stop exceptions button 974 (similar to the stop exceptions button 936 of FIG. 9A), and the current shipment status 975 (similar to the current shipment status 937 of FIG. 9A). Also, order information 980 may include an order number 981 and customer information 982, similar to order number 971 and 972, respectively. Also, order information 980 in the current embodiment includes an additional services button 983 and the current shipment status 985, as described in FIG. 9A; however, order information may also include a stop exceptions button, similar to 974, and/or not include the additional services button 983 or current shipment status 985. Moreover, the interface 950 of FIG. 9B may also include an exceptions button 991, which provides access to the stop exceptions screen (similar to the stop exceptions button 974), and an items button 992, which provides access to the stop or shipment order list. When items button 992 is selected, service application 35 enables the user to view the current items or scan additional items. However, such a configuration is not required, and no icon or different icons may be used. According to various implementations, there may be any number of items in the item interface 950.

Figure 10:
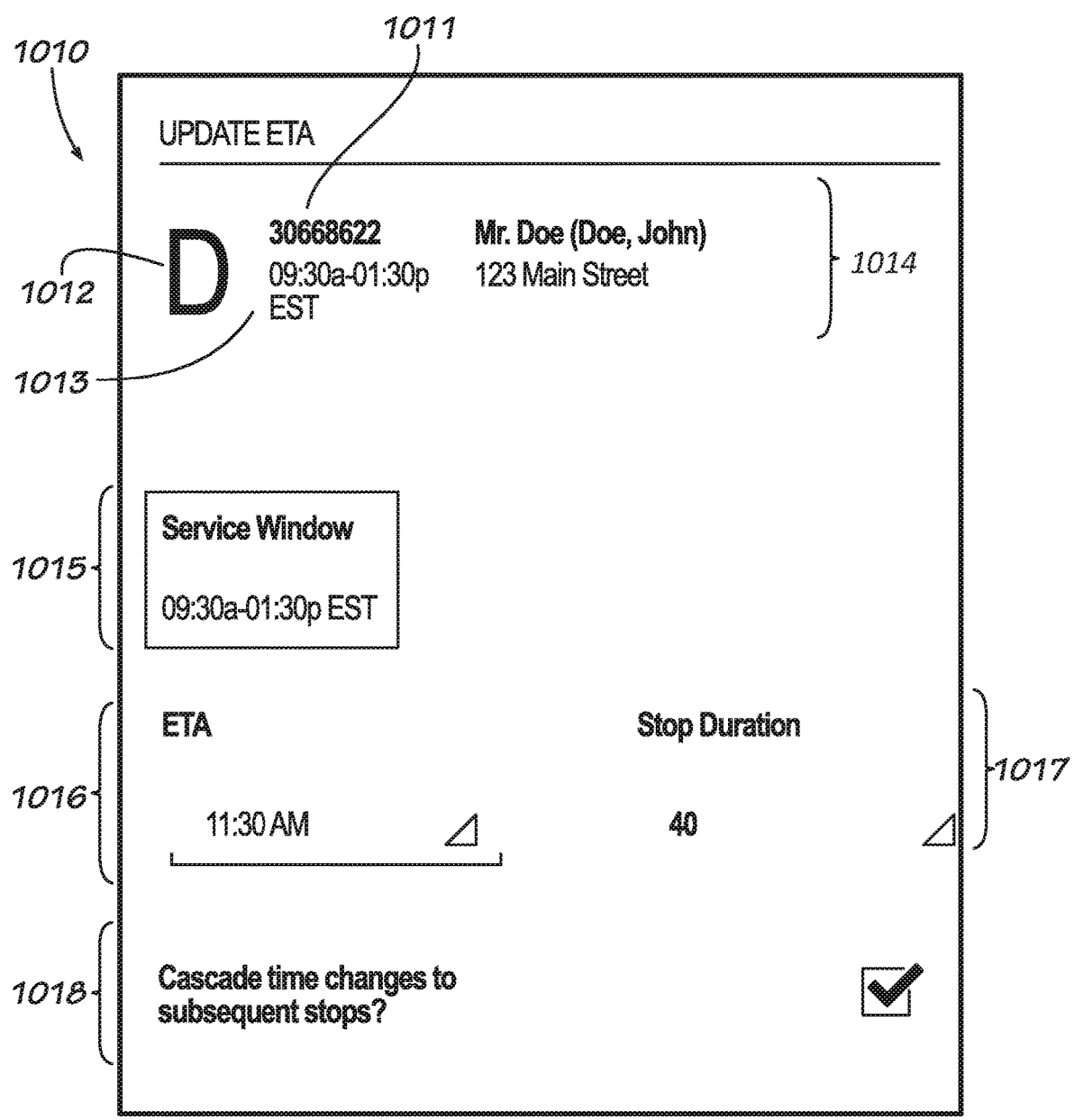
FIG. 10 is a diagram illustrating a user interface of the service application enabling the servicer to at least update and edit aspects of deliveries, according to various implementations of the present disclosure.

FIG. 10 is a diagram illustrating an update ETA interface 1010 of the service application 35. The update ETA interface 1010 may include a customer identification 1011, a status symbol 1012, a service window 1013, and customer information 1014, which may include the customer's name, address, phone number, and other types of contact information, among other information that may be useful or relevant for the servicer. Additionally, the update ETA interface 1010 may include a service window button 1015, an ETA button 1016, and a stop duration button 1017. The service window button 1015, ETA button 1016, and stop duration button 1017 enable the servicer to at least update and modify the ETA, service window, and stop duration, respectively. Moreover, the update ETA interface 1010 may include a cascade time box 1018 that enables the servicer or dispatcher to select whether or not the service application 35 will cascade time changes (ETA or stop duration) made for a particular stop to subsequent stops. For example, when the cascade time box 1018 is selected, if the servicer adds ten minutes to the ETA for a first stop, then the service application 35 may automatically add ten minutes to the ETA for a second stop, a third stop, and so-on (for all subsequent stops).

Figure 11:
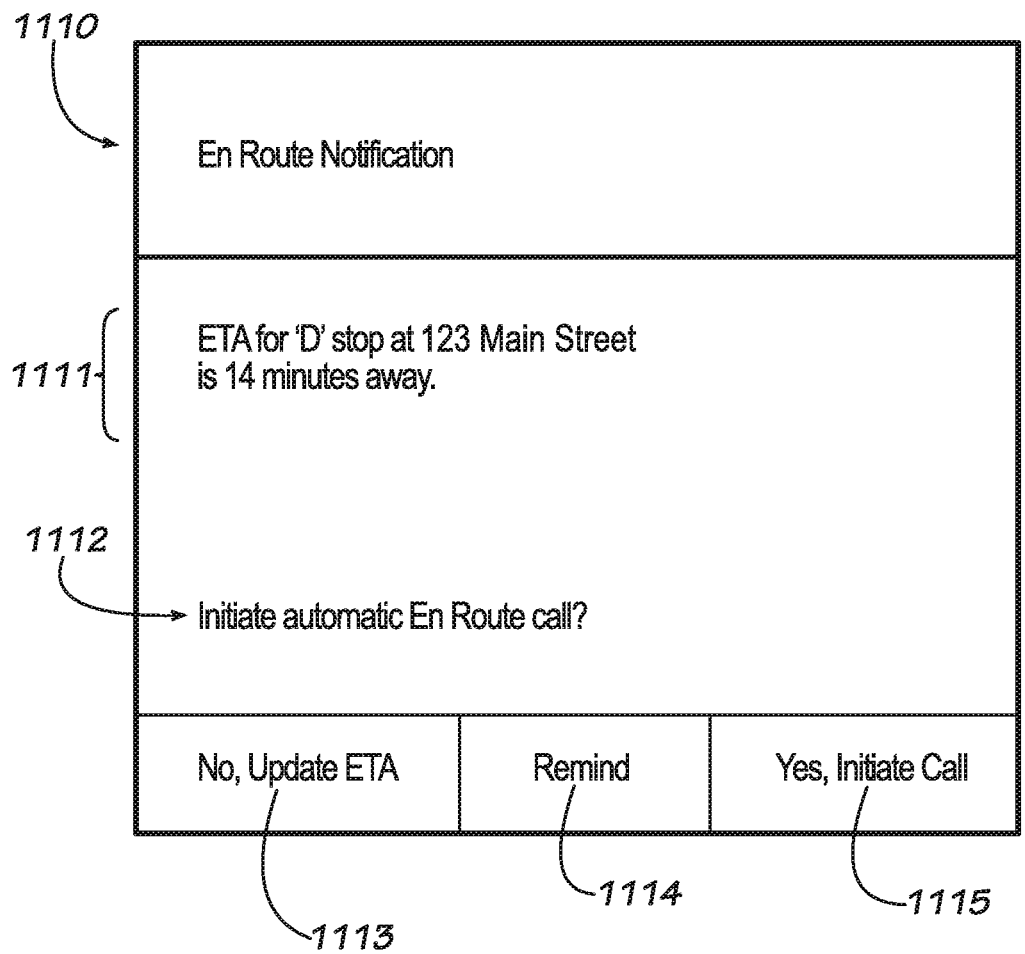
FIG. 11 is a diagram illustrating an en route notification user interface of the service application, according to various implementations of the present disclosure.

FIG. 11 is a diagram illustrating an en route notification interface 1110 of the service application 35. The en route notification interface 1110 may be configured to pop-up on the service application 35 when the scheduled ETA for the servicer is within a certain period of time. For example, the en route notification interface 1110 can be configured to pop-up when the scheduled ETA is in a notification window, which may be, for example, a maximum of one hour and a minimum of two minutes, among other time periods. In the current embodiment, once the service application 35 displays the en route notification interface 1110, the servicer will be provided with en route details 1111, which may include a status symbol (similar to status symbol 922 in FIG. 9A), the stop location (as is included in the customer information 924 in FIG. 9A), and the ETA, among others. In some embodiments, the en route notification interface is not configured to pop-up, and other ways of providing the en route notification may be provided. As can be seen in the current embodiment, a prompt 1112 may be provided to the servicer; however, the prompt 1112 is not required. The en route interface 1110 provides the servicer with three options. However, more or fewer options may be provided to the servicer.

In the current embodiment, the servicer may select the update ETA button 1113, which will take the servicer to the update ETA interface 1010, described above in regard to FIG. 10, where the servicer can update the ETA with the ETA button 1016. Additionally, the servicer may select the remind button 1114, which will close the en route notification interface 1110 for a predetermined amount of time (e.g., five minutes), and then the en route notification interface 1110 will pop up again. For example, a servicer may select the Remind button 1114 when the servicer is using and needs to continue to use the service application 35 in another manner (e.g., the servicer needs to use the directions on the service application 35, among others). Additionally, the servicer may select the initiate en route call button 1115, which will cause the service application 35 to communicate with components of the service network system 34 to reach the order management program 52. As previously described in regard to FIG. 6, an en route call module 74 or other mechanism may then automatically notify the customer of the ETA, how much time will pass before the servicer arrives (i.e., the difference between the ETA and the current time), and/or provide the customer with an option to speak to a representative, among others. In the current embodiment, notification is provided by a telephone call. In some embodiments, notification may be done by telephone call, e-mail, text message, or other communication made to the customer.

Figure 12:
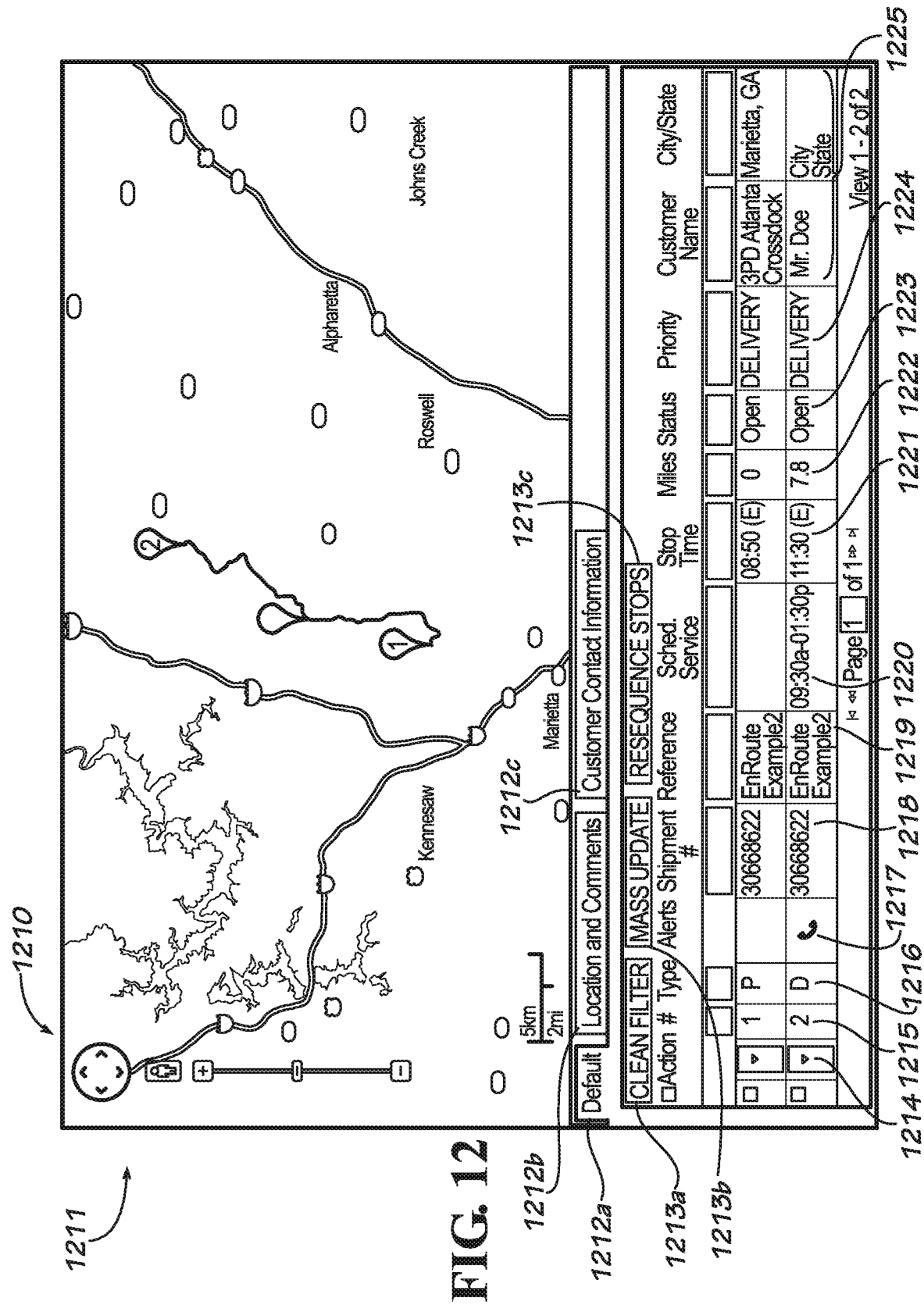
FIG. 12 is a diagram illustrating a user interface enabling the dispatcher to view a map and other information regarding the stops of at least one servicer, according to various implementations of the present disclosure.

FIG. 12 is a diagram illustrating a dispatcher interface 1210 that may be part of the service order management system 36 and communicate with other aspects of the service order management system 36. A dispatcher may be in any remote location from the servicers, and one dispatcher may be able to assist and keep track of a number of servicers on the dispatcher interface 1210 (e.g., one dispatcher can assist and keep track of ten servicers). In the current embodiment, the dispatcher interface 1210 includes a service map 1211, which enables the dispatcher to see where servicers currently are (based on GPS or other location technology), where servicers came from and where they are going (including the sequence of stops the servicer is scheduled to take, and how long it will take the servicers to reach their next destination, among others). In the current embodiment, GPS is only used to indicate the location of the one or more servicers on the dispatcher interface 1210. Additionally, the dispatcher interface 1210 may include one or more charts. In the current embodiment, three buttons are provided at the top of the chart. In other embodiments, more or fewer buttons may be provided. Default button 1212a allows the dispatcher to see a default view of the dispatcher interface 1210, such as the view that is shown in FIG. 12. Location and comment button 1212b allows the dispatcher to see the location of servicers and comments servicers have made, as well as leave their own comments. Customer contact information button 1212c enables to dispatcher to see the contact information for each customer that is scheduled to receive a delivery or service (e.g., the customer information 924 shown in FIG. 9).

Additionally, three additional buttons (1213a, 1213b, and 1213c) are provided in the current embodiment. Clear filter button 1213a enables the dispatcher to clear any filter they have applied to the service application 35, mass update button 1213b enables the dispatcher to update all of the information they are provided with from the service application 35, and resequence stops button 1213c enables the dispatcher to resequence the stops for a particular servicer the dispatcher is assisting and keeping track of. Action arrow 1214 enables the dispatcher to take a multitude of actions in regard to the associated service or customer. For example, by selecting the action arrow 1214 associated with a particular customer, the dispatcher can adjust the ETA, adjust the route, cancel a service, or initiate an en route notification call, among others.

The dispatcher interface 1210 also has a number column 1215 that represents the order that the customer is in the stop sequence, a type column 1216, and an alert column 1217 that can include a multitude of different alerts. For example, as can be seen in the figure, an icon of a telephone is shown in the alert column 1217. The icons displayed in the alert column 1217 may enable the dispatcher to perform different functions and notify the dispatcher of different things. In the current embodiment, depending on the color of the telephone icon, the dispatcher can know whether an ETA notification has been made, and whether or not the ETA notification was successful, if it was made. Moreover, dispatcher interface 1210 may include a customer identification column 1218, a reference column 1219, a schedule service column 1220 (which may contain the same information as the service window 1015 of FIG. 10), a stop time column 1221 (which shows the time the servicer actually stopped at that location or shows an ETA), a miles column 1222 (which shows the number of miles from the previous stop to the current stop), a status column 1223, a priority column 1224, and customer information 1225. Such customer information can include a customer name, address, phone number, email address, other contact information, and any particular notes that may be of relevance for the customer.

Figure 13:
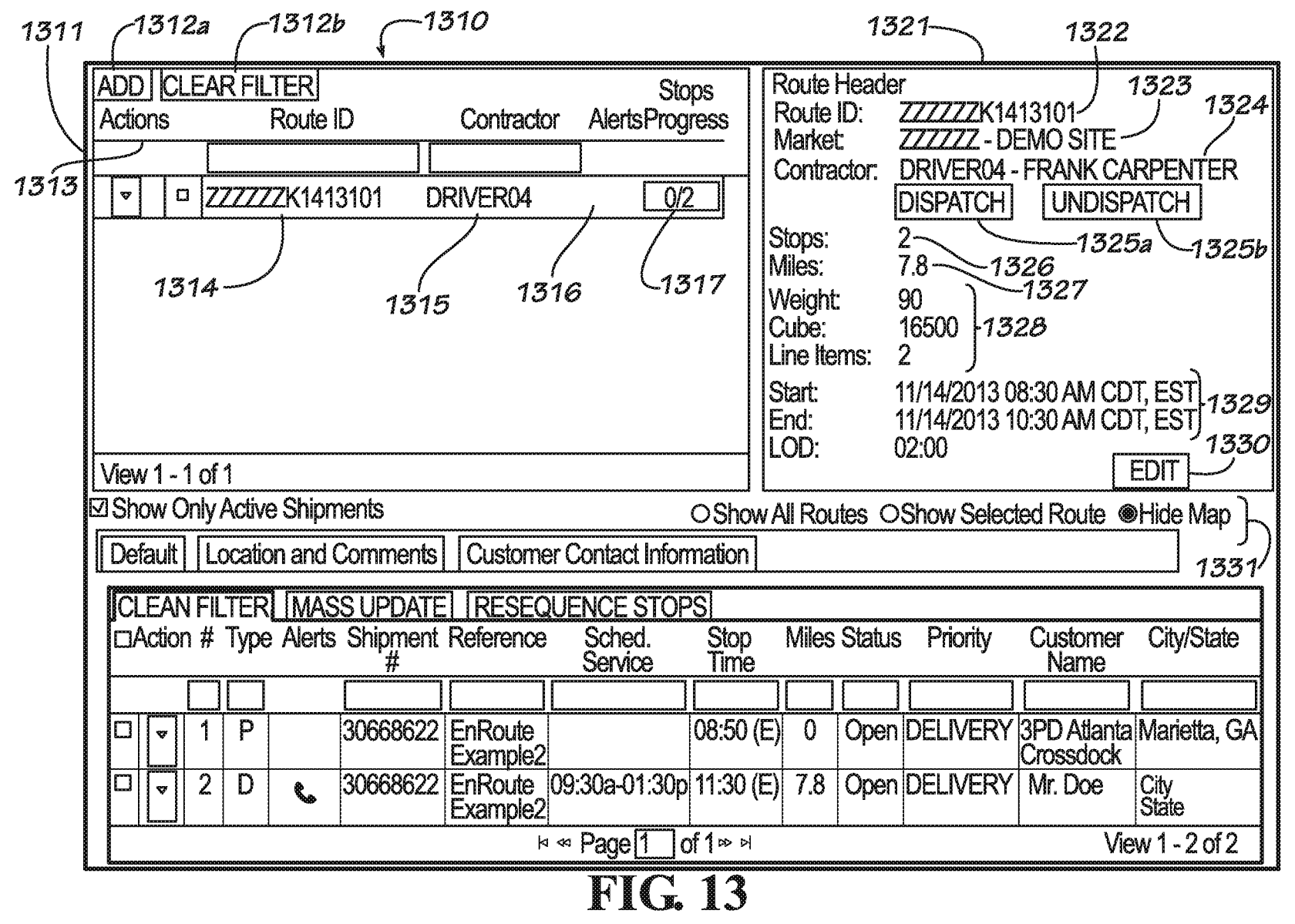

FIG. 13 shows a second dispatcher interface 1310 enabling the dispatcher to view information regarding the stops and items of at least one servicer. The second dispatcher interface 1310 may include the same chart as described above in regard to FIG. 12 (including elements 1213-1225 and buttons 1212a, 1212b, and 1212c). The second dispatcher interface 1310 may also include a servicer chart 1311. The servicer chart 1311, in the current embodiment, includes an add button 1312a, a clear filter button 1312b, an action column 1313, a servicer route identification column 1314, a contractor column 1315 to identify the servicer, an alert column 1316, and a stop/progress column 1317 that enables the dispatcher to see how many stops out of the total number of stops have been made by the servicer. Additionally, the second dispatcher interface 1310 includes a route header chart 1321. According to some embodiments, the route header chart 1321 includes a route identification 1322, a market row 1323, a contractor row 1324, and a dispatch button 1325a and an undispatch button 1325b (which enable the dispatcher to dispatch or recall a servicer on a particular route, to a particular stop, or adjust the servicer's process in a multitude of ways). Additionally, route header chart 1320 may include a stops row 1326, a miles row 1327, item information 1328, time information 1329, an edit button 1330, and chart selection 1331. If routes are shown, and either "Show All Routes" or "Show Selected Routes" is selected in the chart selection 1331, then the dispatcher interface 1210 of FIG. 12 will be shown. However, if "Hide Map" is selected in the chart selection 1331, then the servicer chart 1311 and route header chart 1321 of FIG. 13 will be shown. Such a configuration for the first dispatcher interface 1210 and second dispatcher interface 1310 are not required, and other configurations may be used.

Figure 14:
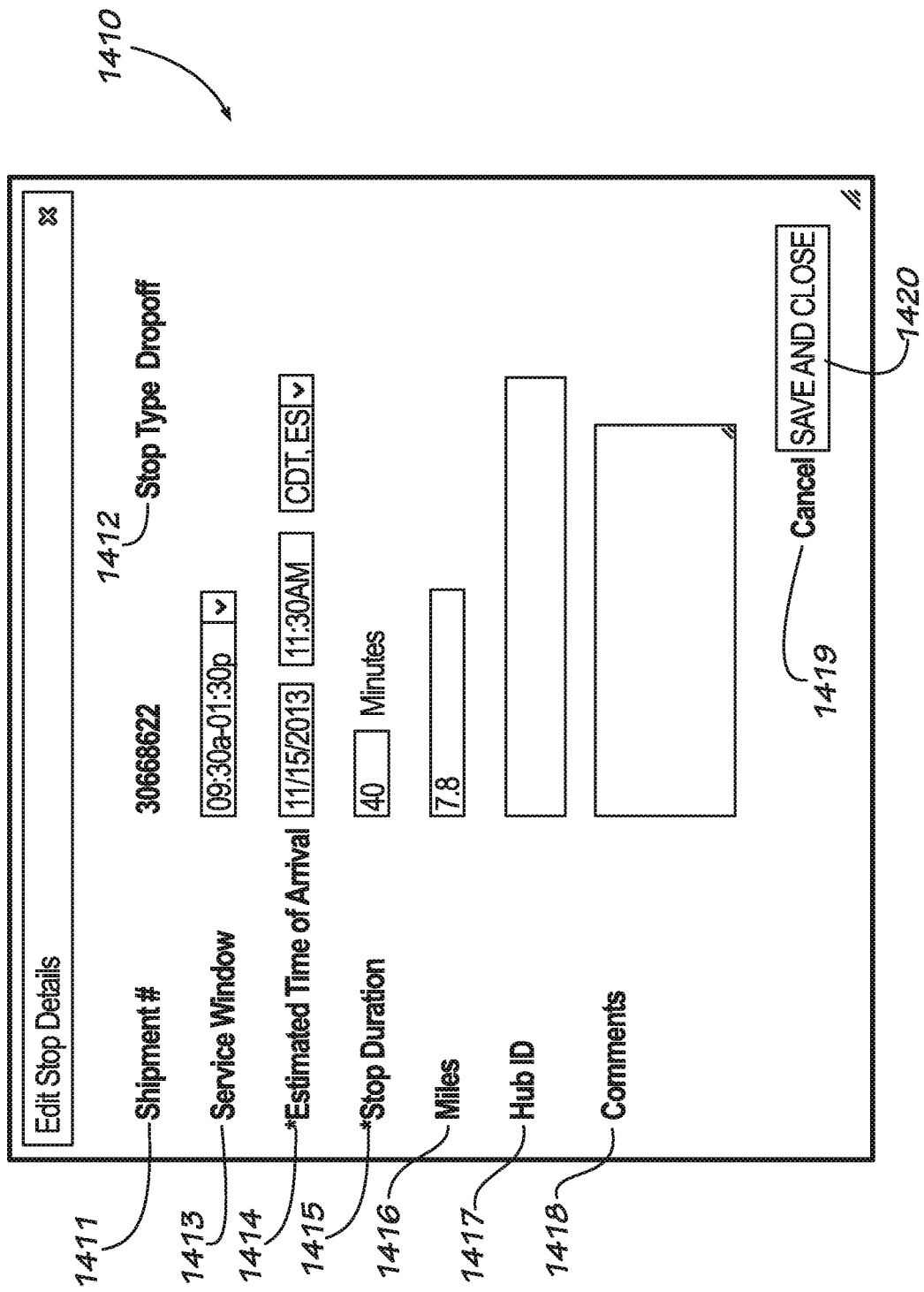
FIG. 14 is a diagram illustrating a user interface enabling the dispatcher to edit information regarding at least the ETA, Stop Duration, Service Window and other information regarding at least one stop of at least one servicer, according to various implementations of the present disclosure.

FIG. 14 shows a dispatcher edit interface 1410. In the current embodiment, if the edit button 1330 is selected from the interface of FIG. 13, then the interface of FIG. 14 will be shown. Dispatcher edit interface 1410, in the current embodiment, includes a customer identification row (seen as "Shipment #") 1411, a stop type row 1412, a service window selection 1413, an ETA selection 1414, a stop duration row 1415, a miles row 1416 (similar to miles row 1327), a hub identification row 1417, and a comments input 1418. Additionally, the dispatcher edit interface 1410 includes a cancel button 1419 and a save and close button 1420.

Figure 15:
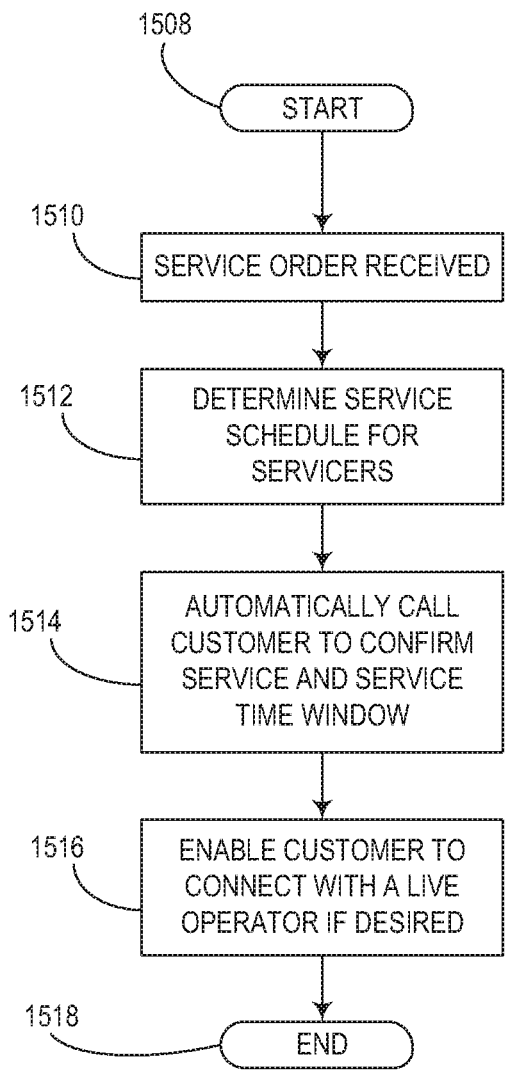
FIG. 15 a flow diagram illustrating a method of a service order management system for performing a confirmation call to a customer to provide a service window, according to various implementations of the present disclosure.

FIG. 15 is a flow diagram illustrating an embodiment of a method for pre-calling a customer. The method may be implemented by the service order management system 36 described above in regard to FIG. 4 or any other system associated with the management of service orders. The terms "pre-call" and "pre-calling" refer to an automatic telephone call, e-mail, text message, or other communication made to the customer in advance of the scheduled service time to notify the customer of a time window during which the service is to be performed, also called a service window. In some embodiments, the pre-call may be made on the evening before the service day. The pre-call method in some implementations may be performed by the confirmation call module 72 described above in regard to FIG. 6.

As indicated in block 1508, the process begins, and in block 1510, a service order for a particular service is received. The service may include any type of service, such as a delivery, maintenance, repair, or other service. As indicated in block 1512, the service schedules for one or more servicers are determined. The schedules may be grouped based on the service locations of multiple service orders received, the types of services to be performed, or other factors. In some embodiments, the servicer may be given access to tools to help create an efficient schedule, based on pick-up locations (if applicable), service locations, delivery locations, estimated travel times and distances between service locations, left turn minimization algorithms, and/or other criteria. In some embodiments, multiple service schedules may be sent to multiple servicers, whereby the method may be repeated for each servicer.

As indicated in block 1514, the method includes automatically calling or communicating with the customer to notify the customer of the scheduled service order and the service window. The notification call may allow the customer to confirm the service order or provide feedback about whether the service and service time window are acceptable to the customer. For example, confirmation can be made by the user pressing a touch tone button on the telephone receiver, speaking a command to a voice recognition device, selecting a "confirm" or "yes" button in an e-mail, or by another method. In some embodiments, the customer may be enabled to re-schedule, cancel or postpone the scheduled service. As indicated in block 1516, the method includes enabling the customer to connect with a live operator if desired. For example, the user may be prompted to press a touch tone button or speak a command to initiate connection with the live operator. The process ends at block 1518.

Figure 16:
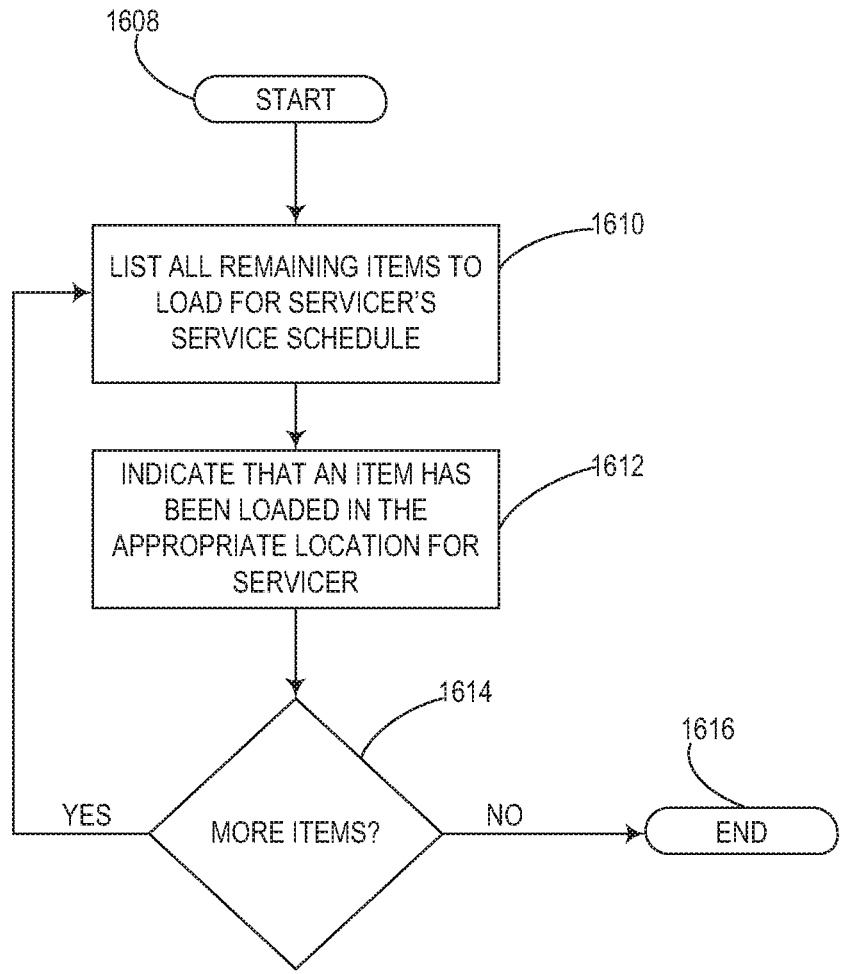
FIG. 16 is a flow diagram illustrating a method of a service order management system, particularly the service application of FIG. 7, for loading the items for each servicer to deliver in their upcoming servicing schedule, according to various implementations of the present disclosure.

FIG. 16 is a flow diagram illustrating an embodiment of a method for loading the items for an upcoming servicer's schedule. The method may be implemented by the service application 35 described above in regard to FIG. 7, for example. This method may be performed for any type of services to be performed. The servicer in these implementations may be any member of a service team, such as a driver, assistant, dispatcher or other member, regardless of whether the person actually performs the intended services.

First, the method starts, as indicated by element 1608. As indicated in block 1610, the method includes listing or indicating all items that are to be loaded for the servicer's schedule. Such items can be stored in one or more locations and in one or more areas of a location. Additionally, the service application 35 may show different lists for each servicer or each servicer may have a particular indicator associated with the items to be loaded for each servicer's schedule. As indicated in block 1612, the method includes receiving an indication from a user (e.g., servicer) that an item has been loaded for a particular servicer to deliver in their upcoming servicing schedule. In the current embodiment, indicating that an item has been loaded can include scanning a code (e.g., bar code, QR code, among others) on the item or on something associated with the item with a device associated with the service application 35 or other aspect of the service order management system 36, inputting a package identification number on the service application 35 or other aspect of the service order management system 36, among other ways which one skilled in the art would know of. In some embodiments, if an item is mistakenly loaded for a particular servicer, the service application 35 of other aspect of the service order management system 36 that was used to identify the item will not recognize the item or reject the item to be loaded. Additionally, if an item is one that is loaded for a servicer to be delivered in that servicer's upcoming servicer's schedule, the service application 35 or other aspect of the service order management system 36 may indicate on the list that the item has been loaded by, for example, changing the color of the item, changing an associated icon of an item, or removing the item from the list, among other ways.

In block 1614, after indication is received that an item has been loaded (per block 1612), the service application 35 or other aspect of the service order management system 36 that is being used will show the remaining items to be loaded. If there are more items to be loaded for a particular servicer, then the method will return back to block 1610. However, if all items have been loaded for a particular servicer's schedule, then the method moves to block 1616, and the method ends for the particular servicer's schedule. In the current embodiment, that particular servicer is then able to begin their servicing schedule. In some embodiments, a servicer may not have any items to load because their scheduled stops require a service or pick up to be made by the servicer.

Figure 17A:
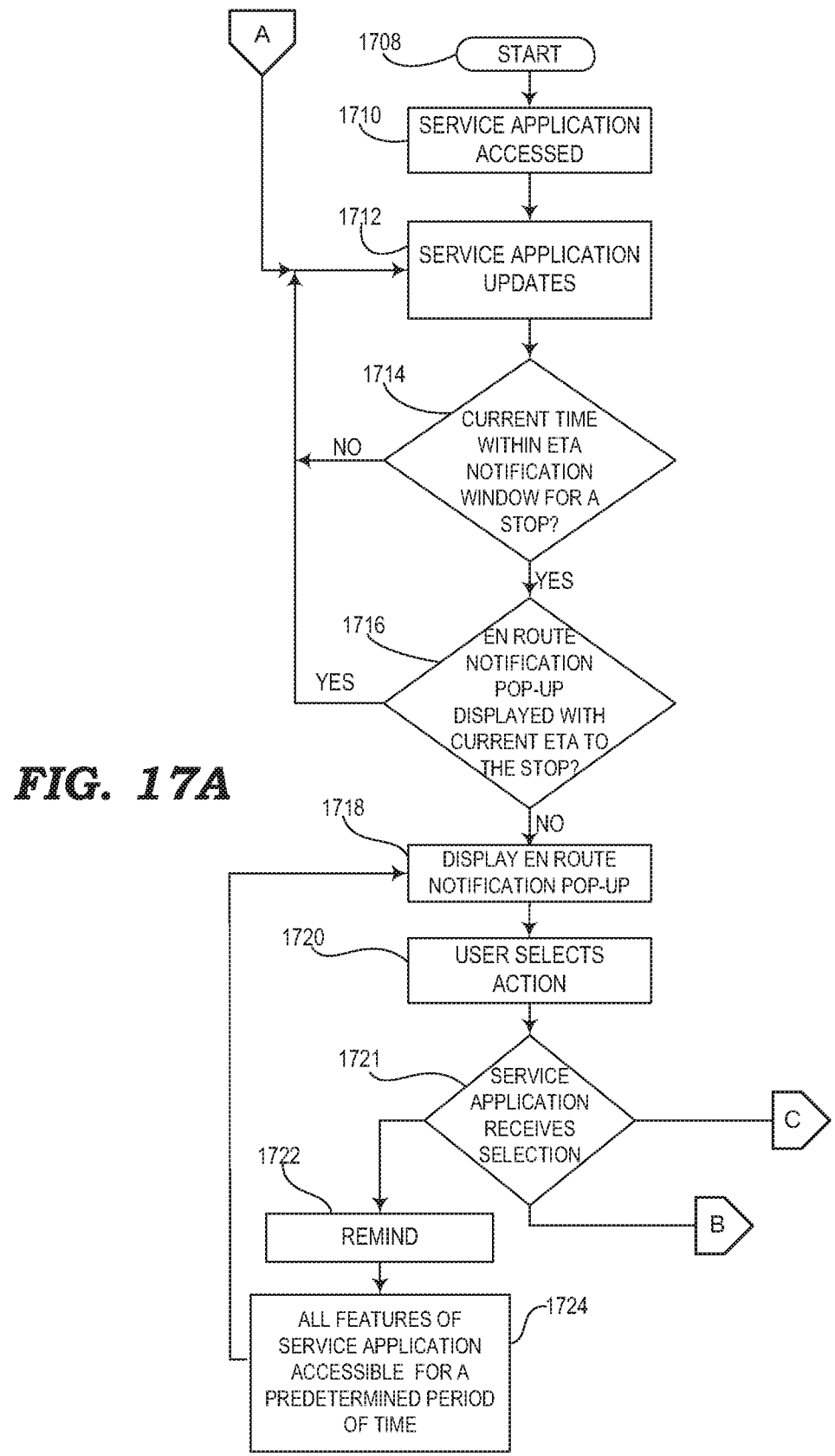
FIGS. 17A and 17B show a flow diagram illustrating a method of a service order management system, including a service application, for providing en route notifications to customers, according to various implementations of the present disclosure.
Figure 17B:
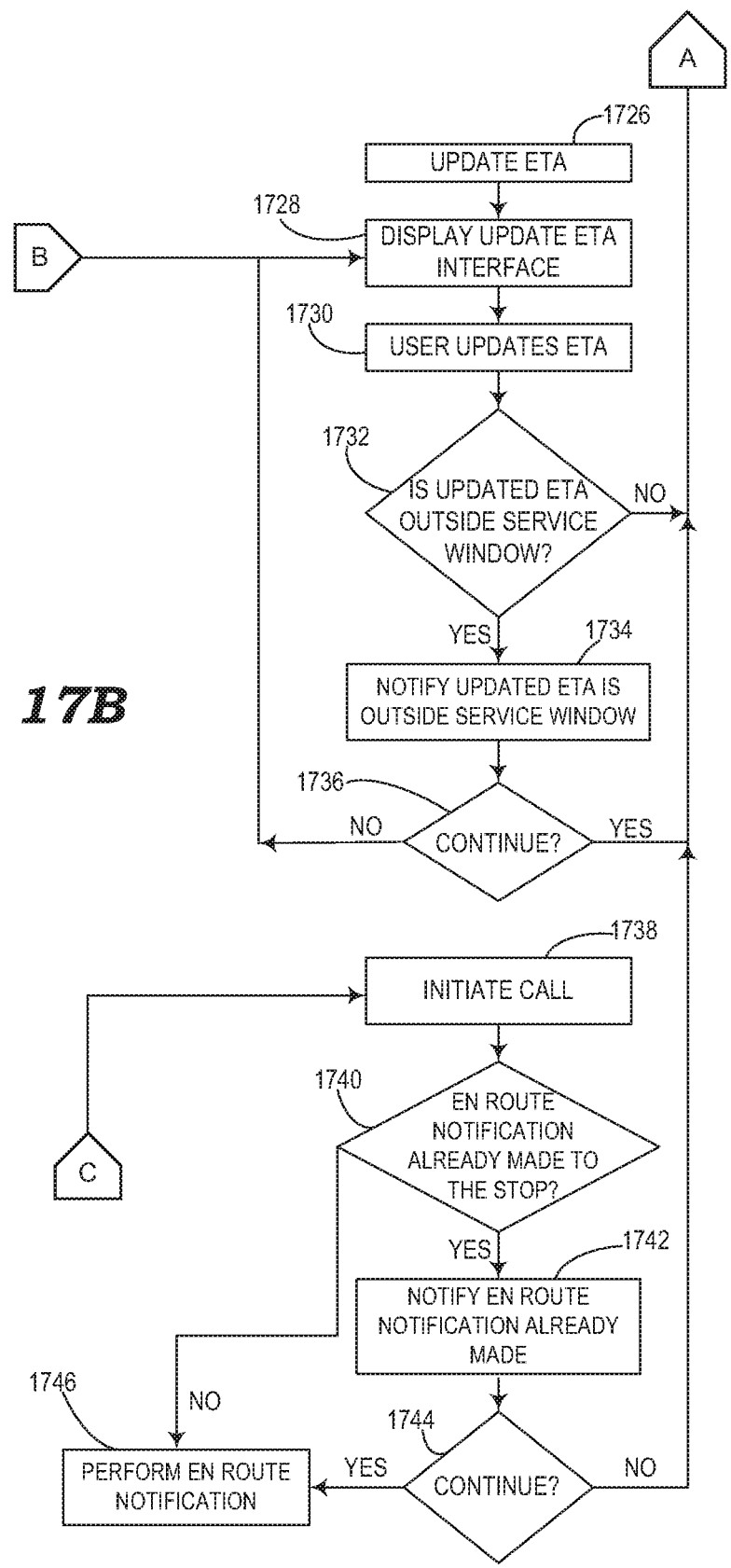

FIGS. 17A and 17B are flow diagrams illustrating an embodiment of a method for providing en route notifications to a customer. The method may be implemented by the service application 35 or another component of the service order management system 36 described above in regard to FIG. 4, or by any other system associated with the management of service orders. Block 1708 indicates the beginning of the method. As indicated in block 1710, a servicer first accesses the service application 35. In some embodiments, the servicer may be required to log-in to their portal or account. As previously stated, service application 35 may be an application on mobile phones, other handheld devices, laptop computers, other electronic devices, or other devices. Additionally, the service application 35 may be used and accessed by servicers and others that are involved with the customer service or delivery. Once a servicer accesses the service application 35 on a device, the servicer is able to see their service schedule, which includes an initial order of scheduled stops, initial default ETAs at the beginning of the service schedule, and the servicer may interact with the service application 35 (e.g., as shown in FIGS. 9-10, including changing ETAs), among others.

As indicated in block 1712, the service application 35 will continuously update the displayed service schedule. In the current embodiment, once the service application 35 is accessed at the beginning of the day or before the route begins, the initial scheduled ETAs are loaded on the service application 35, which is accessed by the servicer on the servicer's device. The device may use pull technology to receive the information from the service order management system 36, particularly the order management program 52 and database 56. Additionally, updates made to the ETAs and order of stops may be pulled from the service order management system 36. In some embodiments, push technology or any other type of technology may be utilized to send the information from the service order management system 36 to the device. In the current embodiment, once the ETAs are loaded to the device, a notification may be set on the device operating system to trigger a device notification when the ETA is within the notification window. In some embodiments, the service application 35 does not need to be active or running on the device for an ETA notification to occur. However, in other embodiments, the ETA notification may be triggered and stored in the service application 35.

As previously discussed, the notification window is a period of time before the ETA of a scheduled stop. For example, if the ETA of a scheduled stop for a particular servicer is 4:30 P.M., and the notification window is, for example, a maximum of one hour and a minimum of two minutes, the notification window is between 3:30 P.M. and 4:28 P.M. As indicated by block 1714, once the ETAs and notification windows are configured and updated, the service application 35 determines if the current time is within the notification window of any scheduled stops. If the current time is not within the notification window for any scheduled stop, then the process goes back to block 1712 where routine updates may occur in the service application 35. However, if the ETA notifications are stored on the servicer's device, then the service application 35 updates are not required to occur before a notification on the device will be triggered. If the current time is within the notification window, then the service application 35 will utilize the service order management system 36 and/or the order management program 52 and database 56 to determine if an en route notification pop-up has already been displayed that provided the current ETA, as seen in block 1716. If an en route notification pop-up has already been displayed that provided the current ETA, then the method will return to block 1712. However, if an en route notification pop-up has not been displayed that provided the current ETA, then the service application 35 will display the en route notification interface pop-up (block 1718), such as that shown in FIG. 11 and described above. Next, the servicer may be provided with three choices from the en route notification interface pop-up to select from (block 1720): remind (block 1722), update ETA (block 1726), or initiate call (block 1738). Upon the selection made by the servicer on the user interface, the service application 35 will receive the servicer's selection, as shown by block 1721.

If the servicer selects remind, as shown by block 1722, then the service application 35 will wait a predetermined amount of time (e.g. 5 minutes), shown by block 1724, and then the method will return to block 1718. In the current embodiment, during the predetermined amount of time, the servicer will be enabled to use all of the features of the service application 35 that the servicer is normally able to use (e.g., as shown in FIGS. 9-10).

As indicated by block 1726, if the servicer selects update ETA, then the service application 35 shows the interface of FIG. 10 to the servicer allowing the servicer to update the ETA for the particular stop at issue (blocks 1728 and 1730). As seen in block 1732, once the ETA is updated by the servicer, the service application 35 determines if the ETA is outside of the service window (i.e. element 1013 of FIG. 9). If the ETA is not outside of the service window, then the method returns to block 1712. However, if the ETA is outside of the service window, then the service application 35 notifies the servicer that the ETA is outside of the service window (block 1734), and prompts the servicer (block 1736) to determine if they would like to continue (i.e., keep the updated ETA even though it is outside the service window). If the servicer determines they do not want to keep the updated ETA, then the method will return to block 1728. If the servicer does want to keep the ETA even though it is outside of the service window, then the method returns to block 1712.

Finally, if the servicer selects initiate call, as shown by block 1738, then the service application 35 will utilize the service order management system 36 to determine if an en route notification has already been made for the particular stop at issue, shown in block 1740. If an en route notification has already been made, then the service application 35 notifies the servicer that an en route notification has already been made to this stop (block 1742), and prompts the servicer to determine if they would like to continue at block 1744 (i.e. if they would still like to initiate an en route notification even though an en route notification has already been made for that particular stop). If the servicer decides they would like to continue, then an en route notification is initiated, as shown at block 1746. If the servicer determines they would not like to continue, then the method returns to block 1712. If no en route notification has been made for the particular stop at issue, then an en route notification is initiated, as shown at block 1746.

In order to provide the en route notification of block 1746, the en route call module 74, shown in FIG. 6 and described above, may be configured to directly or indirectly communicate with the service application 35, and thereby make the call to the customer. In the current embodiment, notification is provided by a telephone call; however, notification may be done by telephone call, e-mail, text message, or other communication made to the customer.

As previously described, in some embodiments, a dispatcher may be used to assist and keep track of one or more servicers. The service application 35 may be used and accessed by servicers, dispatchers, and others that are involved with the customer service or delivery dispatch. The dispatchers, in the current embodiment and as seen in FIGS. 12-14, use a webpage that collects data from the service application 35 and other components of the service order management system 36. In the current embodiment, the dispatchers have the same capabilities as one or more servicers. For example, as shown in FIGS. 12-14, a dispatcher may update the ETA, initiate a call, and modify the order of stops, among other things for their assigned servicers. However, in other embodiments, the dispatcher may not have the same capabilities as the one or more servicers, and they can have more or fewer capabilities. In some embodiments, the servicer may communicate with their assigned dispatcher in order to optimize their deliveries and services. For example, if the servicer is having technical difficulties or needs assistance in finding a route, the servicer can contact the dispatcher to help them find the best route to a stop or assist the servicer in performing tasks and notifications to the customers, among others.

The flow diagrams shown in FIGS. 14-16 show the architecture, functionality, and operation of possible implementations of the service application 35 and the service order management system 36. In this regard, each block may represent a module, segment, portion of code, etc., which comprises one or more executable instructions for performing the specified logical functions. It should be noted that the functions described with respect to the blocks may occur in a different order than shown. For example, two or more blocks may be executed substantially concurrently, in a reverse order, or in any other sequence depending on the particular functionality involved.

The order management program 52, which comprises an ordered listing of executable instructions for implementing logical functions, may be embodied in any computer-readable medium for use by any combination of instruction execution systems or devices, such as computer-based systems, processor-controlled systems, etc. The computer-readable medium may include one or more suitable physical media components configured to store the software, programs, or computer code for a measurable length of time. The computer-readable medium may be any medium configured to contain, store, communicate, propagate, or transport programs for execution by the instruction execution systems or devices.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code that include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

We claim:

1. A notification system comprising:

a service order management system comprising a service order receiving module, a routing module, an automated calling module, and an estimated time of arrival (ETA) module, the service order receiving module configured to receive a plurality of service orders, each service order including service information regarding a service to be performed for a customer, customer location information identifying the location at which the service is to be performed, and a telephone number associated with the customer, the routing module configured to determine the service schedule for a servicer, the service schedule being determined using the customer location information included in the plurality of customer orders, travel time estimation between customer locations, and service performance times associated with the services to be performed at the customer locations, the ETA module configured to calculate an initial ETA for each of the plurality of customer locations based on at least a portion of the service information, and the automated calling module configured to place a telephone call to the telephone number associated with each of the plurality of service orders to inform the customer of the initial ETA associated with their location;

a plurality of mobile servicer devices, each mobile servicer device of the plurality of mobile servicer devices including a service application and being communicatively connected to the service order management system, each service application configured to automatically receive a subset of the initial ETAs from the service order management system, the subset of the initial ETAs corresponding to the service orders associated with the mobile servicer device, display a stop interface that includes a list of stops for the servicer along with the initial ETA and service window for each stop and an update ETA button to allow the servicer to update the ETA for one or more of the stops, in response to the selection of the update ETA button, display an update ETA interface with buttons that allow the servicer to adjust the ETA, service window, or stop duration, and to indicate that changes should be cascaded to subsequent stops, updating ETAs in response to the servicer's interaction with the update ETA interface to calculate current ETAs for the servicer, determine if one of the current ETAs is within an ETA notification window, display, in response to a determination that at least one of the current ETAs is within the ETA notification window, a first en route notification interface on the mobile servicer device, the en route notification interface providing options allowing the servicer to update the ETA, request a reminder, or initiate a call to the customer, receive from the servicer, via the first en route notification interface, a response to the first en route notification interface;

when the response to the first en route notification interface is an instruction to initiate a call to the customer, transmit a signal to the service order management system to notify the customer that the servicer is en route;

when the response to the first en route notification interface is an updated ETA, determine if the updated ETA is within a service window, display, in response to a determination that the updated ETA is not within the service window, an indication that the updated ETA is not within the service window, receive, in response to the indication that the updated ETA is not within the service window, an indication to keep the updated ETA, display, in response to a determination that the updated ETA is within the ETA notification window, a second en route notification interface on the mobile servicer device, receive via the second en route notification interface, an instruction to initiate a notification to the customer, and responsive to receiving the instruction to initiate the notification to the customer, transmit a signal to the service order management system to notify the customer of the updated ETA, which is more accurate than the initial ETA.

2. The notification system of claim 1, wherein the ETA notification window is within about one hour prior to the initial ETA.

3. The notification system of claim 1, wherein the ETA notification window is from one hour prior to the initial ETA to two minutes prior to the initial ETA.

4. The notification system of claim 1, wherein the service application is further configured to:

upon receiving an adjustment to a stop duration or the updated ETA from the servicer and an indication that the updated times should be cascaded, cascade the adjustment and the updated ETA to subsequent stops of the servicer.

5. The notification system of claim 1, wherein the service application is executed on a mobile device of the servicer.

6. The notification system of claim 1, wherein the service order management system is further configured to and enable at least one dispatcher to communicate with the mobile servicer device.

7. A computer implemented method comprising:

receiving, by a service order receiving module in a service order management system, a plurality of service orders, each service order of the plurality of service orders including service information regarding a service to be performed for a customer, customer location information regarding the location at which the service is to be performed, and a telephone number associated with the customer;

determining, by a routing module in the service order management system, a service schedule for a servicer, the service schedule being determined using the customer location information included in the plurality of customer orders, travel time estimation between customer locations, and service performance times associated with the services to be performed at the customer locations;

calculating, by an estimated time of arrival (ETA) module in the service order management system, an initial ETA for each of the plurality of customer locations based on at least a portion of the service information;

placing, by an automated calling module at the service order management system, a telephone call to the telephone number associated with each of the plurality of service orders to inform the customer of the initial ETA associated with their service location;

automatically receiving, at a service application running on a mobile servicer device, the plurality of initial ETAs calculated by the ETA module in the service order management system;

display, on the mobile servicer device, a stop interface that includes a list of stops for the servicer along with the initial ETA and service window for each stop and an update ETA button to allow the servicer to update the ETA for one or more of the stops;

display, in response to the selection of the update ETA button, an update ETA interface with buttons that allow the servicer to adjust the ETA, service window, or stop duration, and to indicate that time changes should be cascaded to subsequent stops;

update ETAs in response to the servicer's interaction with the update ETA interface to calculate current ETAs for the servicer;

determining, by the service application, if one of the current ETAs is within an ETA notification window;

displaying, on the service application in response to a determination that at least one of the plurality of initial ETAs is within the ETA notification window, a first en route notification interface on the mobile servicer device, the first en route notification interface providing options allowing the servicer to update the ETA, request a reminder, or initiate a call to the customer;

receiving, via the first en route notification interface, an updated ETA from the servicer;

determining, by the service application, if the updated ETA is within a service window;

displaying, on the service application in response to a determination that the updated ETA is not within the service window, an indication that the updated ETA is not within the service window;

receiving, on the service application, an indication to keep the updated ETA;

displaying, in response to a determination that the updated ETA is within the ETA notification window, a second en routenotification interface on the mobile servicer device;

receiving, via the second en route notification interface, an instruction to initiate a notification to the customer;

responsive to receiving the instruction to initiate the notification to the customer, transmitting to the service order management system a signal to notify the customer of the updated ETA, which is more accurate than the initial ETA.

8. The computer implemented method of claim 7, wherein the ETA notification window is within about one hour prior to the initial ETA.

9. The computer implemented method of claim 7, wherein the ETA notification window is from one hour prior to the initial ETA to two minutes prior to the initial ETA.

10. The computer implemented method of claim 7, further comprising:

upon receiving an adjustment to a stop duration or the updated ETA from the servicer and an indication that the updated times should be cascaded, cascading the adjustment and updated ETA to subsequent stops of the servicer.

11. The computer implemented method of claim 7, wherein the service application executes on a mobile device of the servicer.

* * * * *